(12) United States Patent
Dariush

(10) Patent No.: US 7,390,309 B2
(45) Date of Patent: Jun. 24, 2008

(54) HUMAN ASSIST SYSTEM USING GRAVITY COMPENSATION CONTROL SYSTEM AND METHOD USING MULTIPLE FEASIBILITY PARAMETERS

(75) Inventor: Behzad Dariush, Sunnyvale, CA (US)

(73) Assignee: Honda Motor Co., Ltd., Tokyo (JP)

( * ) Notice: Subject to any disclaimer, the term of this patent is extended or adjusted under 35 U.S.C. 154(b) by 463 days.

(21) Appl. No.: 10/824,059

(22) Filed: Apr. 13, 2004

(65) Prior Publication Data

US 2004/0249319 A1 Dec. 9, 2004

Related U.S. Application Data

(63) Continuation-in-part of application No. 10/655,460, filed on Sep. 5, 2003, now Pat. No. 7,217,247.

(60) Provisional application No. 60/413,024, filed on Sep. 23, 2002, provisional application No. 60/421,964, filed on Oct. 28, 2002, provisional application No. 60/484,708, filed on Jul. 3, 2003.

(51) Int. Cl.
*A61H 1/00* (2006.01)
(52) U.S. Cl. .............................. 601/5; 601/35
(58) Field of Classification Search ...................... 601/5, 601/33, 34, 35, 23, 27, 29, 31, 32
See application file for complete search history.

(56) References Cited

U.S. PATENT DOCUMENTS

| | | |
|---|---|---|
| 4,244,120 A | 1/1981 | Harris |
| 4,786,847 A | 11/1988 | Daggett et al. |
| 4,834,200 A | 5/1989 | Kajita |

(Continued)

FOREIGN PATENT DOCUMENTS

JP 2000-249570 9/2000

(Continued)

OTHER PUBLICATIONS

Agarwal, S.K. et al., "Theory and Design of an Orthotic Device for Full or Partial Gravity-Balancing of a Human Leg During Motion," IEEE Transactions on Neural Systems and Rehabilitation Engineering, Jun. 2004, vol. 12, No. 2.

(Continued)

*Primary Examiner*—Danton DeMille
(74) *Attorney, Agent, or Firm*—Mark Duell; Fenwick & West LLP

(57) ABSTRACT

A method for obtaining an assist torque to be applied to a human joint, in a human assist system in order to reduce the load on muscles, according to the present invention comprises the step of obtaining a moment due to gravity, acting on a joint of each human segment, based on equations of force and moment balance on each segment. The method further comprises the step of obtaining an assist torque to be applied to the joint to compensate for the moment due to gravity, acting on the joint. In one embodiment of the present invention, various criteria are used such as mechanical energy, metabolic energy and/or a stability/equilibrium factor. In addition, the present invention can account for the situation where there is substantially no relative motion between segments of a given joint and thus, where the mechanical energy component of gravity compensation is approximately zero.

20 Claims, 16 Drawing Sheets

U.S. PATENT DOCUMENTS

| | | | |
|---|---|---|---|
| 5,044,360 | A | 9/1991 | Janke |
| 5,136,227 | A | 8/1992 | Nakano et al. |
| 5,203,346 | A | 4/1993 | Fuhr et al. |
| 5,247,432 | A | 9/1993 | Ueda |
| 5,323,549 | A | 6/1994 | Segel et al. |
| 5,362,288 | A | 11/1994 | Razon |
| 5,432,417 | A | 7/1995 | Takenaka et al. |
| 5,459,659 | A | 10/1995 | Takenaka |
| 5,570,286 | A | 10/1996 | Margolis et al. |
| 5,625,577 | A | 4/1997 | Kunii et al. |
| 5,659,480 | A | 8/1997 | Anderson et al. |
| 5,706,589 | A | 1/1998 | Marc |
| 5,808,433 | A | 9/1998 | Tagami et al. |
| 5,835,693 | A | 11/1998 | Lynch et al. |
| 5,942,869 | A | 8/1999 | Katou et al. |
| 5,982,389 | A | 11/1999 | Guenter et al. |
| 6,045,524 | A | 4/2000 | Hayashi et al. |
| 6,076,025 | A | 6/2000 | Ueno |
| 6,152,890 | A | 11/2000 | Kupfer et al. |
| 6,161,080 | A | 12/2000 | Aouni-Ateshian et al. |
| 6,289,265 | B1 | 9/2001 | Takenaka et al. |
| 6,445,983 | B1 | 9/2002 | Dickson et al. |
| 6,505,096 | B2 | 1/2003 | Takenaka et al. |
| 6,580,969 | B1 | 6/2003 | Ishida et al. |
| 6,633,783 | B1 | 10/2003 | Dariush et al. |
| 6,640,160 | B2 | 10/2003 | Takahashi et al. |
| 6,750,866 | B1 | 6/2004 | Anderson, III |
| 6,766,204 | B2 | 7/2004 | Niemeyer et al. |
| 6,785,591 | B1 | 8/2004 | Hansson |
| 6,943,520 | B2 | 9/2005 | Furuta et al. |
| 7,010,390 | B2 | 3/2006 | Graf et al. |
| 7,013,201 | B2 | 3/2006 | Hattori et al. |
| 7,024,279 | B2 | 4/2006 | Rose, III et al. |
| 7,112,938 | B2 | 9/2006 | Takenaka et al. |
| 7,135,003 | B2 | 11/2006 | Dariush |
| 7,184,858 | B2 | 2/2007 | Okazaki et al. |
| 7,191,036 | B2 | 3/2007 | Takenaka et al. |
| 7,260,450 | B2 | 8/2007 | Okazaki et al. |
| 2003/0018283 | A1 | 1/2003 | Dariush |
| 2003/0023415 | A1 | 1/2003 | Nakamura et al. |
| 2003/0115031 | A1 | 6/2003 | Dariush et al. |
| 2004/0031169 | A1 | 2/2004 | Jensen et al. |
| 2004/0102723 | A1 | 5/2004 | Horst |
| 2004/0107780 | A1 | 6/2004 | Kawai et al. |
| 2004/0158175 | A1 | 8/2004 | Ikeuchi et al. |
| 2004/0193318 | A1 | 9/2004 | Ito |
| 2004/0249319 | A1 | 12/2004 | Dariush |
| 2004/0254771 | A1 | 12/2004 | Riener et al. |
| 2005/0070834 | A1 | 3/2005 | Herr et al. |
| 2005/0102111 | A1 | 5/2005 | Dariush et al. |
| 2005/0104548 | A1 | 5/2005 | Takenaka et al. |
| 2005/0209535 | A1 | 9/2005 | Dariush |
| 2006/0046909 | A1 | 3/2006 | Rastegar et al. |
| 2006/0100818 | A1 | 5/2006 | Nakamura et al. |
| 2006/0139355 | A1 | 6/2006 | Tak et al. |

FOREIGN PATENT DOCUMENTS

| | | |
|---|---|---|
| RU | 2 107 328 C1 | 3/1998 |
| WO | WO 00/35346 | 6/2000 |
| WO | WO 03/002054 A1 * | 1/2003 |

OTHER PUBLICATIONS

Akhlaghi, F. et al., "In-shoe Biaxial Shear Force Measurment: the Kent Shear System," Medical & Biological Engineering & Computing, Jul. 1996, vol. 34, pp. 315-317.

Anderson, Frank C., "Static and Dynamic Optimization Solutions for Gait are Practically Equivalent", Journal of Biomechanics, 2001, vol. 34, pp. 153-161.

Anderson, F. et al., "Dynamic Optimization of Human Walking," Journal of Biomechanical Engineering, Oct. 2001, vol. 123, pp. 381-390.

Anderssen, R. et al., "Numerical Differentiation Procedures for Non-Exact Data," Numererische Mathematik, 1974, vol. 22, pp. 157-182.

Atkeson, C.G., "Learning Arm Kinematics and Dynamics", Annual Reviews, Inc., 1989, vol. 12, pp. 157-183.

Baruh, H., Analytical *Dynamics*, Chapter 7, Rigid Body Kinematics, McGraw-Hill, 1999, pp. 355-371.

Blaya, J., "Force-Controllable Ankel Foot Orthosis (AFO) to Assist Drop Foot Gait," Feb. 2003, web.mit.edu/jblaya/www/MSthesis_final.pdf.

Bronzino, J.D., ed., "The Biomedical Engineering Handbook", IEEE Press, 2$^{nd}$ Ed. vol. 2, 2000, Chapter 142, pp. 1-17.

Burdea, G. et al., "Virtual Reality Technology", 1994, pp. 33-37, John Wiley and Sons, Inc.

Busby, H.R. et al., "Numerical Experiments With a New Differentiation Filter," Transactions of the ASME—Journal of Biomechanical Engineering, Nov. 1985, vol. 107, pp. 293-299.

Chao, E.Y. et al., "Application of Optimization Principles in Determining the Applied Moments in Human Leg Joints During Gait," J. Biomechanics, 1973, vol. 6, pp. 497-510, Pergamon Press, Great Britain.

Craig, J.J., "Nonlinear Control of Manipulators," Introduction to Robotics Mechanics and Control, 2$^{nd}$, Ed., 1989, Chapter 10, pp. 333-361.

Crowninshield, R.D. et al., "A Physiologically Based Criterion Of Muscle Force Prediction In Locomotion," *Journal of Biomechanics*, vol. 14, No. 11, 1981, pp. 793-801.

Cullum, J., "Numerical Differentiation and Regularization," SIAM J. Numer. Anal., Jun. 1971, vol. 8, No. 2, pp. 254-265.

Dariush, B. et al., "Multi-Modal Analysis of Human Motion From External Measurements," Transactions as the ASME, Jun. 2001, vol. 123, pp. 272-278.

Dariush, B, "A Novel Algorithm For Generating A Forward Dynamics Solution To The Traditional Inverse Dynamics Problem," In *4th World Congress of Biomechanics*, Calgary, Canada, 2002.

Dariush, B., "A Forward Dynamics Solutions To Multi-Modal Inverse Dynamics Problems," In *International Society of Biomechanics*, XIXth Congress, Dunedin, NZ, 2003.

Dariush, B., "A Well-Posed, Embedded Constraint Representation of Joint Moments From Kinesiological Measurements," Journal of Biomechanical Engineering, Aug. 2000, vol. 122, pp. 437-445.

Delp, S. et al., "A Computational Framework for Simulating and Analyzing Human and Animal Movement," *IEEE Computing in Science and Engineering*, vol. 2, No. 5, 2000, pp. 46-55.

Dohrmann, C.R. et al., "Smoothing Noisy Data Using Dynamic Programming and Generalized Cross-Validation" Transactions of the ASME—Journal of Biomechanical Engineering, Feb. 1998, vol. 110, pp. 37-41.

Flanagan, R.J., et al., "The Role of Internal Models in Motion Planning and Control: Evidence from Grip Force Adjustments During Movements of Hand-Held Loads", The Journal of Neuroscience, Feb. 15, 1997, vol. 17(4), pp. 1519-1528.

Giakas, G. et al., "A Comparison of Automatic Filtering Techniques Applied to Biomechanical Walking Data," J. Biomechanics 1997, vol. 00, No. 00, 4 pages.

Giakas, G. et al., "Optimal Digital Filtering Requires a Different Cut-Off Frequency Strategy for the Determination of the Higher Derivatives," J. Biomechanics, Apr. 1997, vol. 28, No. 00, 5 pages.

Grood, E.S. et al., "A Joint Coordinate System for the Clinical Description of Three Dimensional Motions: Application to the Knee," Journal of Biomechanical Engineering, 1983, pp. 136-144, No. 105.

Gruber, K., et al., "A Comparative Study of Impact Dynamics: Wobbling Mass Model Versus Rigid Body Models", Journal of Biomechanics, 31 (1998), pp. 439-444.

Hatze, H., "The Use of Optimally Regularized Fourier Series for Estimating Higher-Order Derivatives of Noisy Biomechanical Data," J. Biomechanics, 1981, vol. 14, pp. 13-18.

Hayashibara, Y. et al., "Design of a Power Assist System with Consideration of Actuator's Maximum Torque," 4$^{th}$ IEEE International Workshop on Robot and Human Communication, RO-MAN'95, Tokyo, Jul. 5-7, 1995, pp. 379-384, [online] Retrieved from the Internet<URL:http://ieeexplore.ieee.org/xpl/abs_free.jsp?arNumber=531990>.

Hemami, H., "A Feedback On-Off Model of Biped Dynamics", IEEE Transactions on Systems, Man, and Cybernetics, Jul. 1980, vol. SMC-10, No. 7, pp. 376-383.

Hemami, H. et al., "Modeling And Control Of Constrained Dynamic Systems With Application To Biped Locomotion In The Frontal Plane," IEEE Transactions on Automatic Control, vol. 4, No. 4, Aug. 1979, pp. 526-535.

Hemami, H., "A State Space Model for Interconnected Rigid Bodies," IEEE Trans. on Automatic Control, 1982, pp. 376-382, vol. 27, No. 2.

Hosein, R. et al., "A Study of In-shoe Plantar Shear in Normals," Clinical Biomechanics, 2000, vol. 15, pp. 46-53.

Hungspreugs, P. et al., "Muscle Force Distribution Estimation Using Static Optimization Techiques", Technical Report—Honda R&D Americas.

Jalics, L. et al., "A Control Strategy for Terrain Adaptive Bipedal Locomotion," Autonomous Robots, 1997, pp. 243-257, vol. 4.

Jezernk, S. et al., "Robotic Orthosis Lokomat: A Rehabilitation and Research Tool," Neuromodulation, 2003, pp. 108-115, vol. 6, No. 2.

Kawato, M., "Adaptation and Learning in Control of Voluntary Movement by the Central Nervous System", 1989, Advanced Robotics, vol. 3, pp. 229-249.

Kawato, M., et al., "The Cerebellum and VOR/OKR Learning Models", Elsevier Science Publishers Ltd., 1992, vol. 15, No. 11, pp. 445-453.

Kawato, M., "Internal Models for Motor Control and Trajectory Planning," Current Opinion in Neurobiology, 1999, pp. 718-727, No. 9.

Khatib, O., A Unified Approach For Motion And Force Control Of Robot Manipulators: The Operational Space Formulation, IEEE Journal of Robotics and Automation, RA-3(1), 1987, pp. 43-53.

Klein, C. A. et al., Review Of Pseudoinverse Control For Use With Kinematically Redundant Manipulators, IEEE Transactions on Systems, Man, and Cybernetics, vol. 13, No. 2, 1983, pp. 245-250.

Park, J.H., et al., Biped Robot Walking Using Gravity-Compensated Inverted Pendulum Mode and Computed Torque Control, 1998 IEEE Conference on Robotics and Automation, May 16-20, 1998, pp. 2528-2533, vol. 4 , [online] Retrieved from the Internet<URL:http://ieeexplore.ieee.org/xpl/abs_free.jsp?arNumber=680985>.

Piazza, S. et al., "Three-Dimensional Dynamic Simulation of Total Knee Replacement Motion During a Step-up Task," Journal of Biomechanical Engineering, vol. 123, 2001, pp. 599-606.

Rahman, T. et al., "A Simple Technique to Passively Gravity-Balance Articulated Mechanisms," Journal of Mechanical Design, 1995, pp. 655-658, vol. 117, No. 4.

Runge, C.F. et al., "Estimating Net Joint Torques From Kinesiological Data Using Optimal Linear System Theory." IEEE Transactions on Biomedical Engineering, Dec. 1995, vol. 42, No. 12, pp. 1158-1164.

Shadmehr, R. et al., "Interference in Learning Internal Models of Inverse Dynamics in Humans," Advances in Neural Information Processing Systems, 1995, pp. 1117-1224, Chapter 7.

Shadmehr, R., "Learning Virtual Equilibrium Trajectories for Control of a Robot Arm", Neural Computation, 1990, vol. 2, pp. 436-446.

Simons, W. et al., "Differentiation of Human Motion Data Using Combined Spline and Least Squares Concepts," Journal of Biomechanical Engineering, Transactions of the ASME, Aug. 1991, vol. 113, pp. 348-351.

Thelen, D. et al., "Generating Dynamic Simulations of Movement Using Computed Muscle Control," Journal of Biomechanics, 36, 2003, pp. 321-328.

Transmittal of the International Search Report, PCT/US02/20829, Dec. 12, 2002, 4 pages.

"Unsupported Standing with Minimized Ankle Muscle Fatigue," [online] Retrieved from the Internet<URL:http://ieeexplore.ieee.org/iel5/10/29163/01315854.pdf>.

Vaughan, C. L. et al., "Appendix B., Detailed Mathematics Used in GaitLab," Dynamics of Human Gait, Second Edition, Kiboho Publishers, Cape Town South Africa, 1999, pp. 83-106.

Vukobratovic, M. et al., Scientific Fundamentals of Robotics 7: Biped Loco-motion. Springer-Verlag, 1990, pp. 17-27.

Winter, D.A., "Kinetics: Forces and Moments of Force," Biomechanics and Motor Control of Human Movement, 2nd Ed., New York, 1990, Chapter 4.

Wittenberg, J., Dynamics of Systems of Rigid Bodies, 1977, B.G. Teubner Stuttgart, 1977, pp. 29-30.

Wolpert, D.M., et al., "Ocular Limit Cycles Induced by Delayed Retinal Feedback", Experimental Brain Research, 1993, vol. 96, pp. 173-180.

Woltring, H.J., "A Fortran Package for Generalized, Cross Validatory Spline Smoothing and Differentiation," Adv. Eng. Software, 1986, vol. 8, No. 2, pp. 104-107.

Woltring, H.J., "On Optimal Smoothing and Derivative Estimation From Noisy Displacement Data in Biomechanics," Human Movement Science, vol. 4, 1985, pp. 229-245.

Written Opinion, PCT/IB02/04311, Feb. 20, 2003, 2 pages.

Zajac, F.E., "Muscle and Tendon Properties, Models, Scaling, and Application to Biomechancis and Motor Control", 1989, vol. 17, Issue 4, pp. 359-411.

"Berkeley Researchers Developing Robotic Exoskeleton That Can Enhance Human Strength and Endurance,"ScienceDaily LLC, 1995-2004, [online] [Retrieved on Oct. 9, 2006] Retrieved from the Internet<URL:http://bleex.me.berkeley.edu/bleexhistPDFs/sciencedaily.pdf>.

Durfee, W.K., "Preliminary Design and Simulation of a Pneumatic, Stored-Energy, Hybrid Orthosis for Gait Restoration," Proceedings of IMECE04, 2004 ASME International Mechanical Engineering Congress, Nov. 13-20, 2004, [online] [Retrieved on Oct. 9, 2006] Retrieved from the Internet<URL:http://www.umn.edu/~wkdurfee/publications/IMECE2004-60075.pdf >.

International Search Report and Written Opinion, PCT/US06/11727, Nov. 9, 2006, 9 pages.

Isaacs, P.M. et al., "Controlling Dynamic Simulation with Kinematic Constraints, Behavior Functions, and Inverse Dynamics," Computer Graphics, Jul. 1987, pp. 215-224, vol. 21, No. 4.

Madigan, R.R., "Ankle-Foot Orthoses (AFO's) in Spastic Cerebral Palsy," Fillauer LLC, [online] [Retrieved on Oct. 9, 2006] Retrieved from the Internet<URL:http://www.fillauer.com/education/ED_afo.html#dynamics>.

Pratt, G.A. et al., "Active Orthotics for Helping the Neuromuscularly Impaired to Walk," [online] [Retrieved on Oct. 9, 2006] Retrieved from the Internet<URL:http://www.vcl.uh.edu/~rcv03/materials/grant/9733740.1064791086.pdf>.

"Regenerative Foot Braking," [online] [Retrieved on Oct. 9, 2006] Retrieved from the Internet<URL:http://www.halfbakery.com/idea/regenerative_20foot_20braking#1069693200>.

"Sensorless Fet Element DC Motor Driver," [online] [Retrieved on Oct. 9, 2006] Retrieved from the Internet<URL:http://robotx.sourceforge.net/bridge/bridge.shtml>.

Trost, F.J., "Energy-Storing Feet," JACPOC, 1989, vol. 24, No. 4, [online] [Retrieved on Oct. 9, 2006] Retrieved from the Internet<URL:http://jacpoc.oandp.com/library/1989_04_082.asp>.

Kato, H. and Hirata, T., "The Concepts of a Walking Assistance Suit", The Japanese Society of Mechanical Engineers, Aug. 2001.

Wells, R., Morrisey, M. and Hughson, R., "Internal Work and Physiological Responses During Concentric and Eccentric Cycle Ergometry", Eur. J. Appl. Physiol, 55: 295-301, 1986.

Gagnon, M. and Smyth, G., "Muscular Mechanical Energy Expenditure as a Process for Detecting Potential Risks in Manual Materials Handling", J. Biomechanics, vol. 24, No. 3/4; pp. 191-203, Nov. 1991.

Winter, D.A., "Biomechanics and Motor Control of Human Movement", 2nd Edition, John Wiley & Sons, Inc., pp. 51-74.

Gagnon D., and Gagnon, M., "The Influence of Dynamic Factors on Triaxial Net Muscular Moments at the L5/S1 Joint During Asymmetrical Lifting and Lowering", Journal of Biomechanics, vol. 25, pp. 891-901, 1992.

Hsiang, S.M., and McGorry, R.W., "Three Different Lifting Strategies for Controlling the Motion Patterns of the External Load", Ergonomics, vol. 40, pp. 928-939, 1997.

Wyeth, G. F., et al., "Distributed Digital Control of a Robot Arm," Proceedings of the Australian Conference on Robotics and Automation (ACRA 2000), Aug. 30-Sep. 1, 2000, pp. 217-222, [online] [retrieved on Dec. 31, 2006] Retrieved from the Internet: <URL: www.itee.uq.edu.au/~wyeth/Publications/puma.PDF>.

PCT International Search Report and Written Opinion, PCT/US06/22582, Feb. 2, 2007, 8 pages.

PCT International Search Report and Written Opinion, PCT/US05/11908, Mar. 8, 2007, 7 pages.

PCT International Search Report and Written Opinion, PCT/US06/14069, Aug. 31, 2007, 8 pages.

PCT International Search Report and Written Opinion, PCT/US06/01343, Aug. 15, 2007, 8 pages.

* cited by examiner

HUMAN ASSIST SYSTEM USING GRAVITY COMPENSATION CONTROL SYSTEM AND METHOD USING MULTIPLE FEASIBILITY PARAMETERS

CROSS-REFERENCE TO RELATED APPLICATIONS

This application is a continuation-in-part of U.S. patent application Ser. No. 10/655,460 filed on Sep. 5, 2003 now U.S. Pat. No. 7,217,247 which claims priority of U.S. provisional applications No. 60/413,024 filed on Sep. 23, 2002 and No. 60/421,964 filed on Oct. 28, 2002 and No. 60/484,708 filed on Jul. 3, 2003 which are all incorporated by reference herein in their entirety.

FIELD OF THE INVENTION

The present invention relates to a method for obtaining assist torques to be applied to joints of legs through gravity compensation control in a human assist system. The present invention further relates to a human assist system with gravity compensation control.

BACKGROUND OF THE INVENTION

At Honda's Wako Research Center, a mechanically powered walking assist prototype system was recently unveiled (Katoh and Hirata, The Concept of a Walking Assistance Suit, Welfare Engineering Symposium, The Japan Society of Mechanical Engineers, August 2001). The target application is to help the elderly and disabled people to either execute daily tasks they could not previously perform, or use less physical exertion than they currently employ for these tasks. The tasks considered include walking, lifting, sitting/standing, and climbing stairs. A big challenge in developing control algorithms for exoskeleton systems is the control problem. The complexity of the central nervous system (CNS) control and the interface between voluntary control and external artificial control are challenging, unanswered questions.

Thus, there is a great need for a human assist system and a method which will mitigate the interface between voluntary control and external artificial control.

SUMMARY OF THE INVENTION

A method for obtaining an assist torque to be applied to a human joint, in a human assist system in order to reduce the load on muscles, according to the present invention comprises the step of obtaining a moment due to gravity, acting on a joint of each human segment, based on equations of force and moment balance on each segment. The method further comprises the step of obtaining an assist torque to be applied to the joint to compensate for the moment due to gravity, acting on the joint. In one embodiment of the present invention various criteria are used such a mechanical energy, metabolic energy and/or stability/equilibrium balance. In addition, the present invention can account for the situation when there is substantially no relative motion in a joint and thus, the mechanical energy component of gravity compensation is approximately zero.

DETAILED DESCRIPTION OF THE PREFFERRED EMBODIMENTS

Figure 1:
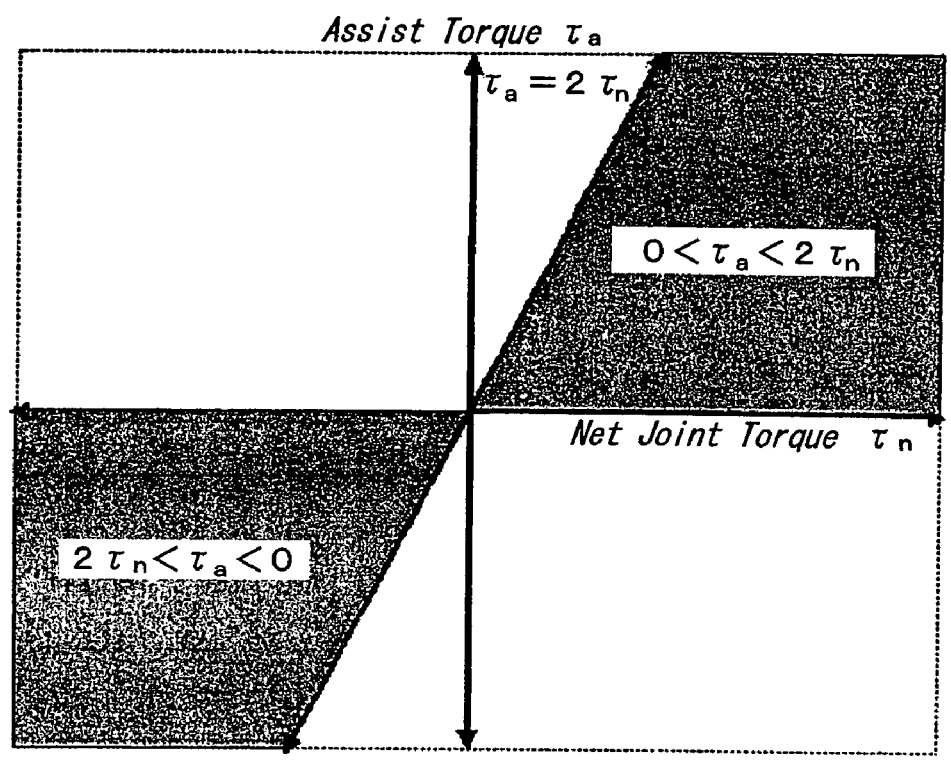
FIG. 1 shows the region where feasible assist is given.

Human exoskeletons are structures of rigid links mounted on the body that promise to enable normal humans to perform their daily activities with less effort. A major limitation of the practical use of exoskeletons for daily activities relate to the control problem. The complexity of the central nervous system (CNS) control and the interface between voluntary control and external artificial control are challenging, unanswered questions. In this specification, we present a novel method for partitioning the mechanism between voluntary control and artificial control by the concept of relegation of control. In particular, the control of humans equipped with an augmentation device (human assist system) is relegated to two subsystems: motion generation and gravity compensation. The motion generation subsystem represents execution of voluntary motion from commands generated from the central nervous system. This subsystem describes the kinetic energy of the motion. The gravity compensation subsystem is responsible for artificial control of the actuators attached to the body. The gravity compensation control accounts for the potential energy of the system and is responsible for compensating for the torques due to gravitational acceleration. This partitioning of the control to the corresponding kinetic and potential energy is hypothesized to mitigate the amount of interference between voluntary control and artificial control.

Gravity Compensation Concept

Skeletal muscles which produce the muscle torque are also called "voluntary muscles" because they are responsible for purposeful movement of the body. These muscles are voluntary as the person can control their motion with his/her will. A challenging problem in the design of exoskeleton controls is to develop controllers which minimize the interference between the assist control and the voluntary motion executed by the neuromuscular system. In order to design an effective controller, consider the mathematical representation of the dynamics of a musculoskeletal system actuated by voluntary control from the muscles and artificial control from the augmentation device. The dynamics can be modeled by the following set of differential equations, $$M(q)\ddot{q} + H(q,\dot{q}) + G(q) = \tau_m + \tau_a \quad (1)$$

where $\tau_m$ and $\tau_a$ are the torques developed from the voluntary control of muscle actuators and artificial control of assist actuators, respectively. The vector q represents the generalized coordinates, M is the inertia matrix, H describes the effects of the coriolis and centrifugal torques, and G is the vector of gravitational forces. Equation 1 describes the dynamics of an unconstrained system. If the motion of the human involves external contact, or closed loops (such as both feet on the ground), the dynamics must be modified, $$M(q)\ddot{q} + H(q,\dot{q})\dot{q} + G(q) = \tau_m + \tau_a + J^T \Gamma \quad (2)$$

where, $J^T$ is the Jacobian transpose matrix, and $\Gamma$ represents the contact force.

The sum of the voluntary muscle torque $\tau_m$ and exoskeleton assist torque $\tau_a$ represents the net joint torque, $\tau_n$ acting at the joint $$\tau_n = \tau_m + \tau_a \quad (3)$$

The computation of the actuator controls from the system of equations in 1 is inherently ill-posed, i.e. different combinations of muscle torques and assist torques can produce the same motion (or same net joint torque). One method to resolve the redundancy is by a concept called relegation of control. A relegated control strategy can be used to assign (or relegate) the motion generation component of the dynamics to voluntary motion, actuated by the muscles, and to assign the static equilibrium component to the exoskeleton actuators.

This subdivision is equivalent to partitioning the equations of motion into the kinetic energy component and the potential energy component, respectively. Since the rate of change of the potential energy of the system is simply the torque due to gravity, the exoskeleton actuators must generate a torque $\tau_g$ to compensate for forces due to gravitational acceleration. The mathematical representation of this partitioning for the unconstrained system is given by, $$\tau_a = \tau_g = G(q) \quad (4)$$

$$\tau_m = M(q)\ddot{q} + H(q,\dot{q})\dot{q} \quad (5)$$

Therefore, the control law for the assist torque $\tau_a$ is simply a controller which negates the effects due to gravity. Hence, we refer to the control law of equation 4 as gravity compensation controller.

The gravity compensation control has several compelling features as noted below.

1) There is a natural subdivision between the voluntary actuators which are responsible for forward progression of motion and the assist actuators which are responsible for preserving static equilibrium. This subdivision may mitigate the interference between voluntary control and artificial control.

2) Since gravity torques are a function of joint positions and orientations and do not contain velocity and acceleration terms, a gravity compensation strategy is not sensitive to noise amplification from numerical differentiation of kinematic variables.

3) Although gravity compensation can be viewed as a model based control strategy, it has limited sensitivity to parametric uncertainties as compared to inverse dynamics methods which require very precise dynamic models.

One limitation of a pure gravity compensation control algorithm is that it may degrade efficiency for certain tasks whereby gravity effects actually help the forward progression of motion. For example, human gait is believed to be a highly efficient motion due to the passive transfer of potential to kinetic energy from the gravitational forces. A method is required to determine when gravity compensation will help motion and when it will interface with the natural dynamics of the system. Subsequently, a more intelligent control can be developed to account for the deficiency of gravity compensation for certain tasks and at a particular point.

In the following section, we provide the basis for instances when gravity compensation is mechanically efficient, i.e. preserves the natural dynamics of the overall system.

The Basis for an Intelligent Assist Control

The coordinated and intelligent action of the assist torque not only provides opportunity to reduce fatigue and risk of injury, but also enables control of joint impedance to stabilize motion. Although it is difficult to quantify the degree to which an assist torque can stabilize motion, the effects of additional actuation on the energetics of motion may be more readily incorporated in the design of an assist control. The mechanical energies are excellent means of quantifying and describing the efficiencies associated with an assist control algorithm. At the joint level, the biomechanical quantities used to describe the power generated by the muscles is the product of net voluntary muscular moment, $\tau_m$ and joint angular velocity, $\Omega$.

$$P_m = \tau_m \Omega \quad (6)$$

Similarly the net joint power is given by $$P_n = \tau_n \Omega \quad (7)$$

Evaluation of power output at the joint level overlooks the presence of co-activation which has been experimentally confirmed in stabilizing the musculoskeletal system by enhancing the joint impedance. In other words, the power equations described in Equation 6 and 7 cannot account for simultaneous generation of power by one muscle group and absorption by the antagonist group, or vice versa.

However, if the power contribution of individual muscles is considered, a more precise consideration of energy flow in the system can be obtained which may point to more appropriate algorithms for assist control. If the muscle force and the rate of change of muscle length are known, the power contribution of an individual muscle (Pm) can be determined from $$P_m = F_m \dot{L} \quad (8)$$

where $F_m$ and $\dot{L}$ represent muscle force and muscle velocity, respectively. It should be noted that the muscle power at the joint level, using Equation 6, is not equivalent to the sum of the power contribution of muscles that span it. Power is the rate of doing work. In order to calculate work done, we must integrate power over a period of time. The work done by the voluntary muscular action during a period $t_1$ to $t_2$ is $$W_m = \int_{t_1}^{t_f} P_m \, dt \qquad (9)$$

Similarly, the net mechanical work from the muscles and the assist actuators is given by, $$W_n = \int_{t_1}^{t_f} P_n \, dt \qquad (10)$$

The power Pm and work Wm can be either positive or negative. Positive work is work done during a concentric contraction, when the muscle moment acts in the same direction as the angular velocity of the joint. Concentric contractions occur when the muscle contraction permits the muscle to shorten. Negative work is work done during an eccentric contraction, when the muscle moment acts in the opposite direction to the movement of the joint. Eccentric action occurs when a muscle is activated, but is forced to lengthen due to the high external load. A larger muscle tension can be created by the same activation level during eccentric action at the muscle length and velocity than during the concentric action. Also, it has been shown that eccentric contraction is metabolically more efficient. References should be made to the following documents which are incorporated by reference herein in their entirety: (1) R Wells, M Morrisey, and R Hughson. Internal and physiological responses during concentric and eccentric cycle ergometry. *Eur. J. Appl. Physiol,* 55:291-301, 1986; and (2) M. Gagnon and G. Smith. Muscular mechanical energy expenditure as a process for detecting potential risks in manual materials handling. *J. Biomech.,* 24(3/4):191-203, November 1991.

The metabolic cost (MC) of performing a task should take into account the efficiencies associated with positive and negative work, $$MC = \frac{W^+}{n^+} + \frac{W^-}{n^-} \qquad (11)$$

where $W^+$ represents concentric work (the work done when the muscles shorten) and $W^-$ represents eccentric work (the work done when the muscles lengthen). The constants n+ and n⁻ are the efficiencies associated with concentric and eccentric action, respectively. At the muscle level, the total metabolic cost of synergistic action of m muscles is obtained by integrating the instantaneous total power and considering the higher metabolic efficiency of eccentric action.

$$MC = \int_{t_0}^{t_f} \left\{ \sum_{i=1}^{m} \left/ \frac{P_{m_i}^+}{n^+} \right/ + \left/ \frac{P_{m_i}^-}{n^-} \right/ \right\} dt \qquad (12)$$

The computation of mechanical work or metabolic work is unable to resolve the metabolic cost of isometric muscle action. In an unassisted human motion involving isometric work against gravity, mechanically there is no movement; thus no mechanical work is done. However, metabolically there is a cost. The work requirement to hold body segments against gravity cannot therefore be determined with the muscle power or joint power computations. Such work is not negligible in many pathologies and in work-related lifting or carrying tasks where loads are held momentarily against gravity or are carried with a forward body lean for extended periods. This fact leads to an interesting and practical advantage of gravity compensation control. That is, gravity compensation intrinsically removes the metabolic costs associated with isometric contractions against gravity. In an alternate embodiment, described below, the invention accounts for various criteria to determine whether and how to apply a computed torque using, e.g., mechanical energy, metabolic energy and stability.

Feasibility of Assist Torque

One criterion for determining the feasibility of an assist control algorithm is to consider the effect of an assist control on metabolic cost. We consider the instantaneous assist torque to be metabolically feasible if the metabolic cost of the assisted control is less than the metabolic cost of unassisted control, $$\frac{|P_m|}{n_m} < \frac{|P_n|}{n_n} \qquad (13)$$

where $n_m$ and $n_n$ represent the instantaneous metabolic efficiency, depending on if the instantaneous power is positive or negative.

In order to simplify our analysis by considering only the mechanical cost of motion, suppose $n_m = n_n = 1$. Then Equation 13 simplifies to, $$|\tau_m| < |\tau_n| \qquad (14)$$

In terms of mechanical energy, the above assumption implies that the design of assist control should be such that the magnitude of the assisted muscle torques does not exceed the magnitude of the unassisted muscle torque. We can express the inequality constraint in terms of the assist torque $\tau_a$ as follows. From Equation 3, the following relation holds, $$|\tau_m| = |\tau_n - \tau_a| \qquad (15)$$

Substituting Equation 15 into Equation 14, $$|\tau_n - \tau_a| < |\tau_n| \qquad (16)$$

It follows that a necessary and sufficient condition to satisfy Equation 16 is to apply an assist torque that satisfies the following inequality constraint.

$$0 < \tau_a < 2\tau_n \quad \tau_n > 0 \qquad (17)$$
$$2\tau_n < \tau_a < 0 \quad \tau_n < 0$$

The feasibility region according to the criteria in Equation 17 is plotted in FIG. 1. In order to develop an intelligent gravity assist controller, we must consider the mechanical energies and the associated feasibility region. For making a general control strategy, it is imperative to develop hybrid controller that will complement the gravity compensation controller presented here, leading to a control strategy that will utilize the natural dynamics of the system when gravity helps motion, as well as compensate for gravity when the gravitational forces are hindering motion.

A method for obtaining an assist torque to be applied to a human joint, in a human assist system in order to reduce the load on muscles, according to the present invention comprises the step of obtaining a moment due to gravity, acting on a joint of each human segment, based on equations of force and moment balance on each segment. The method further comprises the step of obtaining an assist torque to be applied to the joint to compensate for the moment due to gravity, acting on the joint. In one embodiment of the present invention various criteria are used such a mechanical energy, metabolic energy and/or stability/equilibrium balance as described in greater detail below. In addition, the present invention can account for the situation when there is substantially no relative motion in a joint and thus, the mechanical energy component of gravity compensation is approximately zero.

A human assist system for applying an assist torque to a human joint to reduce load of muscles, according to one embodiment of the present invention comprises a motor for applying an assist torque to a joint and a motor driver for driving control of the motor. The system further comprises a controller for determining a desired value of an assist torque, comprising a processor and a memory. The controller is configured to obtain a moment due to gravity, acting on a joint of each human segment, based on equations of force and moment balance on each segment and then to obtain an assist torque to be applied to the joint to compensate for the moment due to gravity, acting on the joint.

Thus, according to the present invention, there is a natural subdivision between the voluntary actuators which are responsible for forward progression of motion and the assist actuators which are responsible for preserving static equilibrium. This subdivision may mitigate the interference between voluntary control and artificial control.

According to an embodiment of the present invention, a moment due to gravity, acting on the joint is obtained based on a ground reaction force acting on the foot, the center of pressure of the foot, and an inclining angle of each segment in the step of obtaining a moment due to gravity, acting on the joint.

Thus, a moment due to gravity, acting on the joint can be easily obtained without using a complicated method.

According to another embodiment of the present invention, terms of accelerations except those of the acceleration of gravity, terms of angular acceleration and terms of horizontal forces are set to zero in the equations of force and moment balance on each segment, to obtain a moment due to gravity, acting on the joint.

Thus, a moment due to gravity, acting on the joint can be obtained with reliability and without measuring or calculating terms of center of mass accelerations, terms of angular acceleration and terms of horizontal forces.

According to another embodiment of the present invention, the applied torque at any given joint is estimated by calculating the net torque due to gravitation acceleration.

Thus, the applied torque at any given joint can be easily estimated.

According to another embodiment of the present invention, a ground reaction force is obtained based on measurement from a sensor. Accordingly, a ground reaction force can be obtained with reliability.

According to another embodiment of the present invention, a ground reaction force is obtained based on predetermined constants. Accordingly, a ground reaction force can be easily obtained without fail.

According to another embodiment of the present invention, the center of pressure under the foot is obtained based on measurements from a sensor. Accordingly, the center of pressure under the foot can be obtained with reliability.

According to another embodiment of the present invention, an assist torque is obtained in real time through real time processing. Accordingly, the method and system are appropriate to real-time human assist control.

According to another embodiment of the present invention, segments include, a foot, a shin and a thigh. Accordingly, an assist torque to be applied to any of an ankle joint, knee joint and a hip joint can be obtained.

According to another embodiment of the present invention, an inclining angle of each segment is obtained based on a measurement from a sensor. Accordingly, an inclining angle of each segment can be obtained with reliability.

According to another embodiment of the present invention, the sensor is a joint angle sensor which indicates a joint bending angle.

According to another embodiment of the present invention, the joint angle sensor is a potentiometer.

Thus, an inclining angle of each segment can be obtained with reliability and without a need for a sophisticated sensor.

According to another embodiment of the present invention, the method is used during a period of human operations of lifting and lowering a load. Accordingly, the human assist control can be carried out with reliability during a period of human operations of lifting and lowering a load.

According to another embodiment of the present invention, the system is of exoskeleton type. Accordingly, control of the human assist system of exoskeleton type can be carried out with reliability.

Iterative "Ground Up" Gravity Compensation

Figure 2:
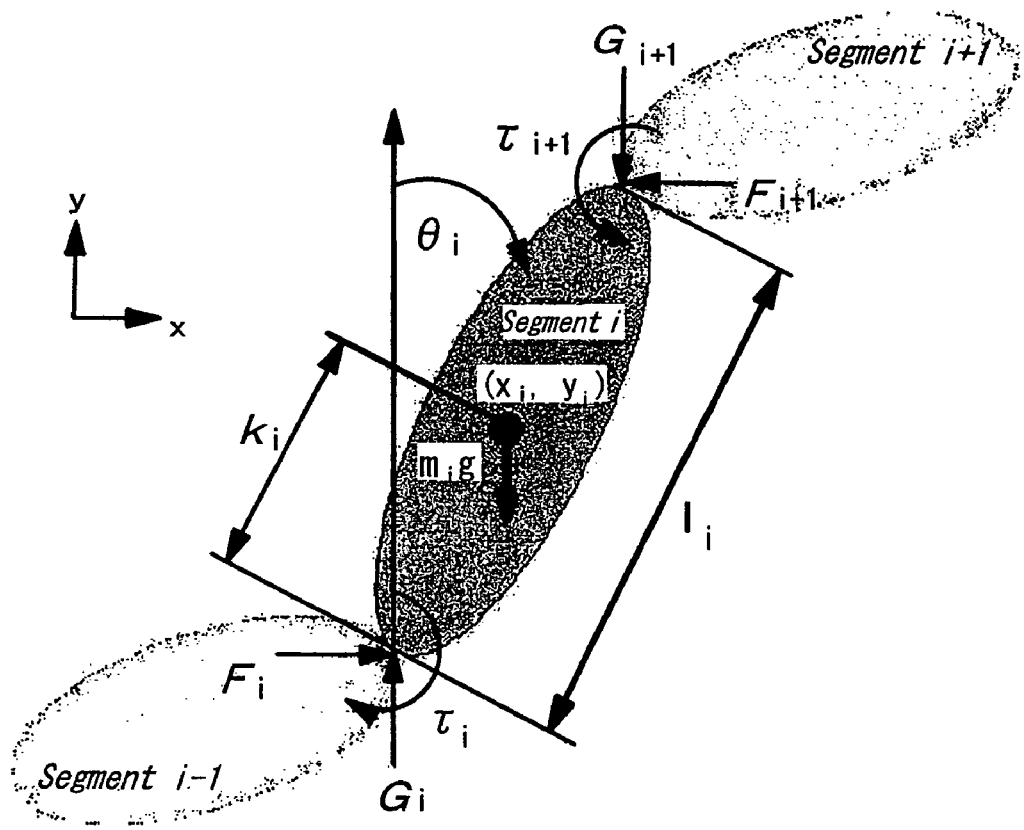
FIG. 2 shows isolated rigid body.

Here, we present the gravity compensation algorithm in a recursive formulation. This formulation is more suited for realization of exoskeleton control schemes that are more robust to parametric uncertainties and un-modeled dynamics. The algorithm uses the vertical ground reaction force as a constraint, and iteratively computes the moments at the joints due to gravity. Consider a multi-body planar dynamical system. For an isolated body segment i (i=1 . . . n) as shown in FIG. 2, let $(\ddot{x}_i, \ddot{y}_i), \theta_i, \ddot{\theta}_i$ be respectively the accelerations of the center of mass, joint angle with respect to the vertical, and angular acceleration. The physical parameters, $m_i$, $I_i$, $l_i$, and $k_i$, represent the mass, moment of inertia, segment length, and length to center of mass of link i.

Let $F_i$, $G_i$, and $\tau_i$, represent respectively, the horizontal force, vertical force, and joint moment exerted on segment i by segment i−1. Similarly, let $$-F_{i+1}, -G_{i+1}, \text{ and } -\tau_{i+1}$$

represent respectively, the horizontal force, vertical force, and moment exerted on segment i by segment i+1. The following Newton-Euler equations are derived from analysis of the force and moment balance on each segment.

$$F_{i+1} = F_i - m_i \ddot{x}_i \tag{18}$$

$$G_{i+1} = G_i - m_i g - m_i \ddot{y}_i \tag{19}$$

$$\tau_{i+1} = \tau_i - F_i k_i \cos(\theta_i) + G_i k_i \sin(\theta_i) - F_{i+1}(l_i - k_i)\cos(\theta_i) + G_{i+1}(l_i - k_i)\sin(\theta_i) - I_i \ddot{\theta}_i$$

Consider link one to be the foot and let $F_1$, $G_1$, be the ground reaction force acting at the center of pressure. The reaction moment at center of pressure is considered to be zero, i.e., $\tau_1=0$. The length $l_i$ originates at the center of pressure and terminates at the ankle joint, and the length $k_i$ originates at the center of pressure and terminates at the center of mass of the foot. The coordinates of the center of mass of each segment are calculated using kinematic equations. Using the above Newton Euler equations, the "ground up" inverse dynamics procedure utilizes the kinematics as well as the ground reaction forces to recursively estimate the net joint force and net joint moment at successive joints. Equation 20 represents the net joint torque $\tau_{n_i}$ at joint i. In theory, the vector of joint torques $\tau_{n_i} \forall i \in [1 \ldots n]$ is identical to the net joint torque obtained using Equation 3. The distinction is that this procedure is iterative and requires the ground reaction force as a constraint. The integration of ground reaction forces and kinematic data in an iterative procedure is advantageous because the formulation does not require modeling the entire body: it is therefore the preferred method for estimating joint moments and joint forces at the ankle, knee, and hips.

With the proper constraints, the "ground up" inverse dynamics equations may be used to develop a "ground up" gravity compensation algorithm. From Equations 18-20, it follows that the contribution of gravity and vertical static loads on the joint moments can be observed by setting all accelerations, and all horizontal joint reaction forces to zero. That is, $$\ddot{x}_i = \ddot{y}_i = \ddot{\theta}_i = F_i = 0$$

Using the above constraints in Equations 18-20, we obtain the iterative formulation to compute the force and moment at each joint due to the effect of gravity (denoted by the subscript g).

$$F_{g(i+1)} = 0 \quad (22)$$

$$G_{g(i+1)} = G_{g(i)} - m_i g \quad (23)$$

$$\tau_{g(i+1)} = +\tau_{g(i)} + G_{g(i)} k_i \sin(\theta_i) + G_{g(i+1)}(l_i - k_i)\sin(\theta_i)$$

Since the above equations relate the effect of vertical static loads to the net moment, the constraints for the ground reaction must appropriately be selected as $$F_{g(1)} = 0 \quad (24)$$

$$\tau_{g(1)} = 0 \quad (25)$$

$$G_{g(1)} = \sum_{i=1}^{n} m_i g + G_e \quad (26)$$

where $G_e$ is the net vertical static force due to external loads and $$\sum_{i=1}^{n} m_i g$$

is the gravitational force due to total body mass.

Suppose joints i (i=1 ... n) are all actuated. The gravity compensation control law used to generate the desired assist control at each joint is, $$\tau_{a(1)} = 0 \quad (27)$$

$$\tau_{a(i+1)} = \tau_{g(i+1)} \quad (28)$$

The desired assist torque at all the joint is simply the vector generated by $$\tau_{a(desire)} = [\tau_a(1), \tau_a(2), \ldots \tau_a(n)] \quad (29)$$

If a joint is not actuated, then the assist torque at that joint is simply zero.

Entire System

Figure 3:
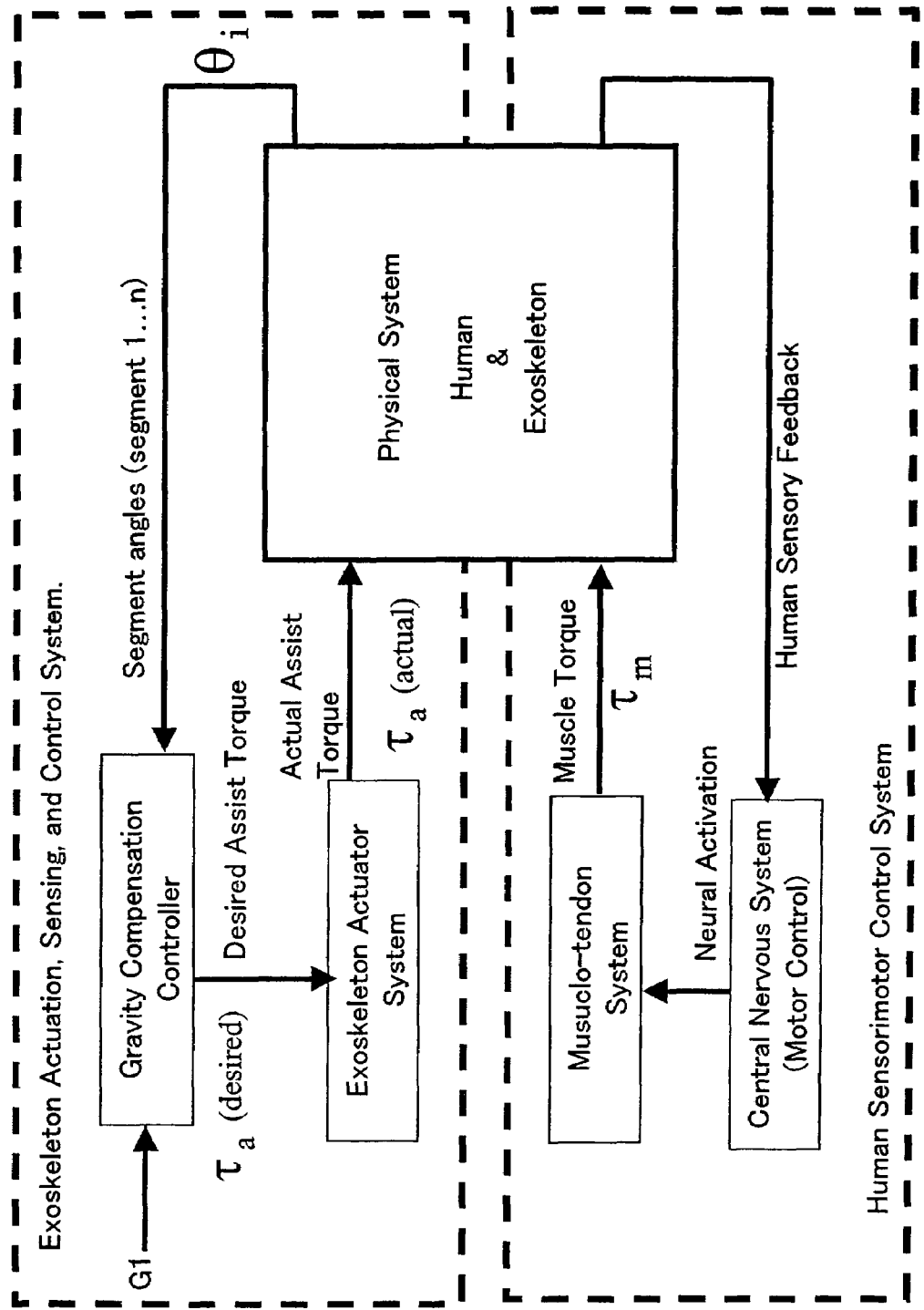
FIG. 3 is a block-diagram of the interaction of the human sensory motor control system and the exoskeleton actuation, sensing, and control system in order to control the human body equipped with an exoskeleton.

The block-diagram of the entire system including a gravity compensation controller, an exoskeleton actuator system and a human and an exoskeleton is shown in FIG. 3. The exoskeleton actuator/control system takes the desired assist torque that is calculated using the above controller and attempts to generate the desired torque at its output. The actual assist torque that is used to drive the human joints is the output of the actuator system. The gravity compensation controller and the exoskeleton actuator system constitute a human assist system.

Human Assist System

Figure 5:
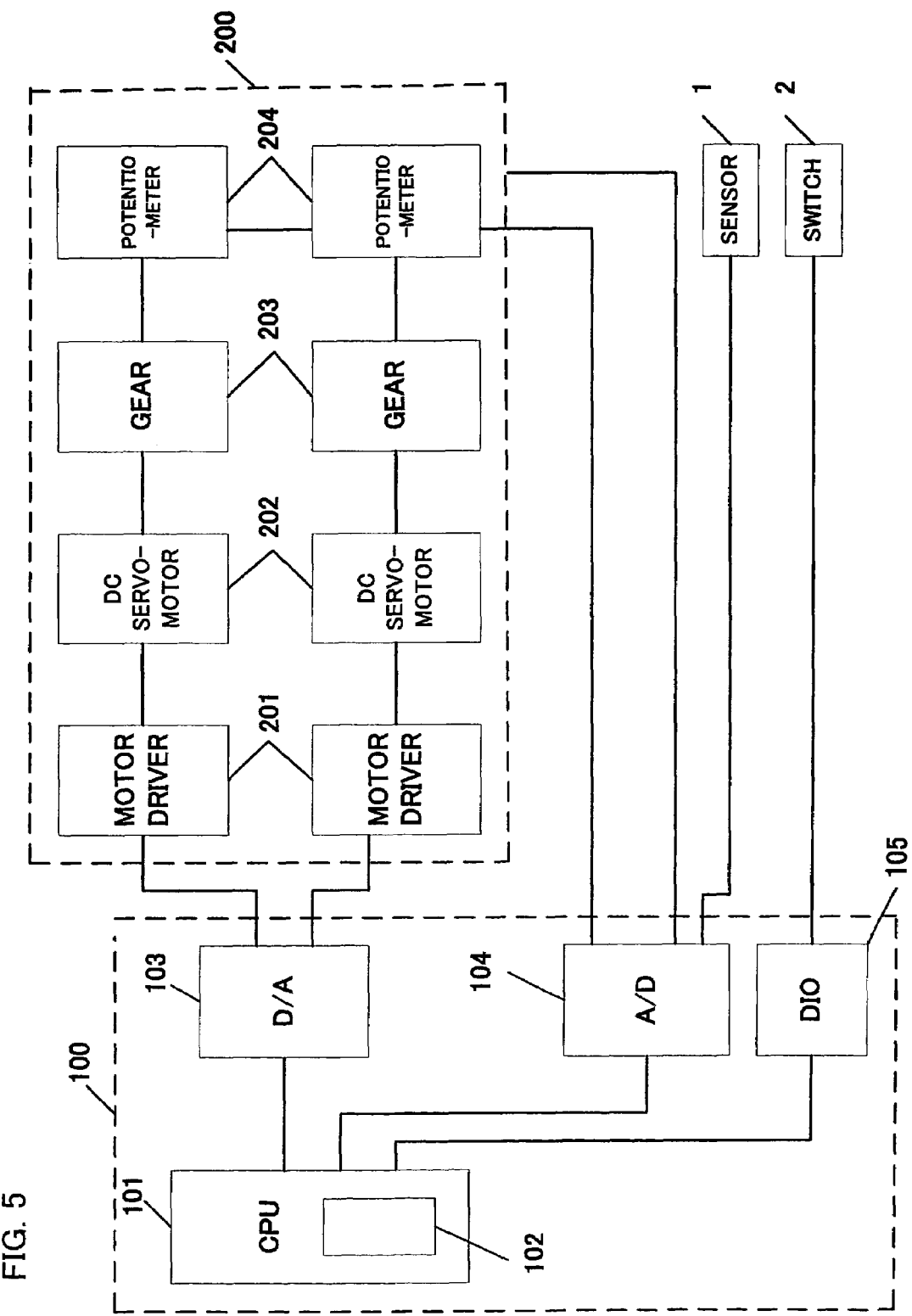
FIG. 5 is a block-diagram of the human assist system.

The block-diagram of the human assist system is shown in FIG. 5. As mentioned above, the human assist system comprises the gravity compensation controller 100 and the exoskeleton actuator system 200. The gravity compensation controller 100 has a CPU 101, a memory 102, a D/A converter 103, an A/D converter 104 and a digital input/output unit 105. The exoskeleton actuator system 200 has an actuator unit for applying a desired assist torque to each of the joints. The joints include both ankle joints, both knee joints and both hip joints. A plurality of actuator units are provided for these joints. Each actuator unit includes a motor driver 201, DC servomotor 202, a gear 203 and a potentiometer 204.

When a start/stop switch 2 is set to ON state (that is, a start switch is tuned on), the gravity compensation controller 100 starts its operation. When the start/stop switch 2 is set to OFF state (that is, a stop switch is tuned on), the gravity compensation controller 100 stops its operation. While the start/stop switch 2 is set to "ON" state, the gravity compensation controller 100 iteratively calculates a desired assist torque for each joint at certain intervals, based on Equations 22 to 29. In Equation 26, $G_{g(1)}$ may be obtained through measurement with a ground reaction force sensor 1. The ground reaction force sensor 1 may be a load-cell type one set either on the bottom side of a foot or on the floor. Alternatively, $G_{g(1)}$ may be obtained using data stored in the memory 102. The center of pressure under each foot may be calculated or measured using in-shoe pressure sensor. The body segment parameters, such as mass of each segment, location of the center of mass of each segment, and lengths of each segment may be obtained using regression equations as reported in, Winter D. A (1990), Biomechanic and Motor Control of Human Movement, $2^{nd}$ Edition, Jhon Wiley & Sons, Inc. which is incorporated by reference herein in its entirety.

The mass of an external load, lifted or carried, by the person may be known from prior measurement. The mass may be assumed to be equally shared by the right side segments and the left side segments. In Equation 23, a joint angle with respect to the vertical (joint inclining angle) $\theta_i$ may be obtained based on an output of the potentiometer 204 at each joint. The output of the potentiometer 204 represents a bending angle at the joint (joint bending angle). A joint angle with respect to the vertical $\theta_i$ can be calculated from a bending angle at each joint.

Then the gravity compensation controller 100 delivers a desired value of assist torque for each joint, to each motor driver 201 of each actuator unit through D/A converter 103. In each actuator unit, the motor driver 201 drives the DC servomotor 202 to deliver the desired assist torque to each joint.

Operational Process

Figure 6:
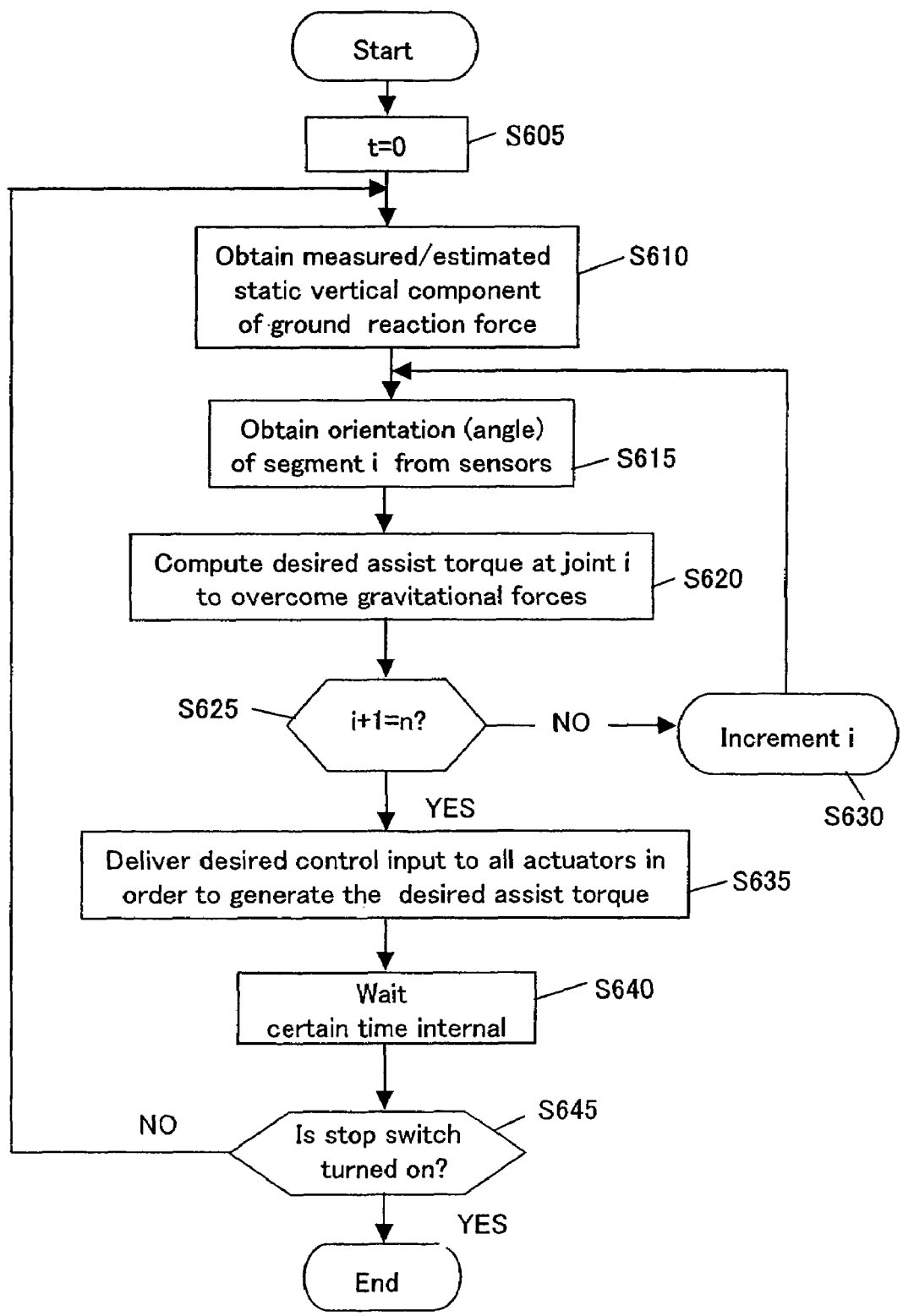
FIG. 6 is a flowchart showing operations of the human assist system.

FIG. 6 is a flowchart of operational process of the human assist system.

At step S605, time is set to zero when the start switch 2 is turned on. At step S610, the static vertical component of ground reaction force is obtained through measurement or estimation.

At step 615, a joint angle with respect to the vertical $\theta_i$ (orientation of segment i) is obtained through a sensor, which may be the potentiometer at each joint. At step 620, a desired assist torque at joint i to overcome gravitational forces, is calculated based on Equations 22 to 29.

At step 625, it is determined whether or not calculations have been carried out for all segments. If the calculations have not been carried out for any of the segments, a counter for i is incremented by 1 at step S630 and then the process returns to step S615. Otherwise, the process proceeds with step S635.

At step S635, a desired assist torque is delivered to each actuator unit through D/A converter in order to generate the desired assist torque. At step S640, the process waits a certain time interval.

At step S645, it is determined whether or not the stop switch 2 is turned on. If the result of the determination is affirmative, the process ends. If the result of the determination is negative, the process returns to step S610.

Simulations

Figure 4:
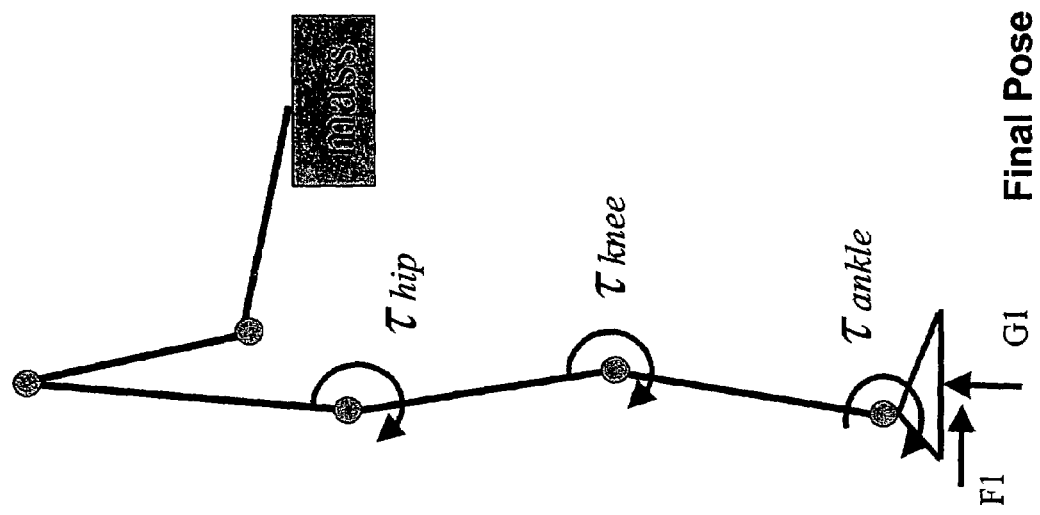
FIG. 4 is a six-segment planar biped showing the initial and final position of the lifting cycle of the motion.
Figure 4:
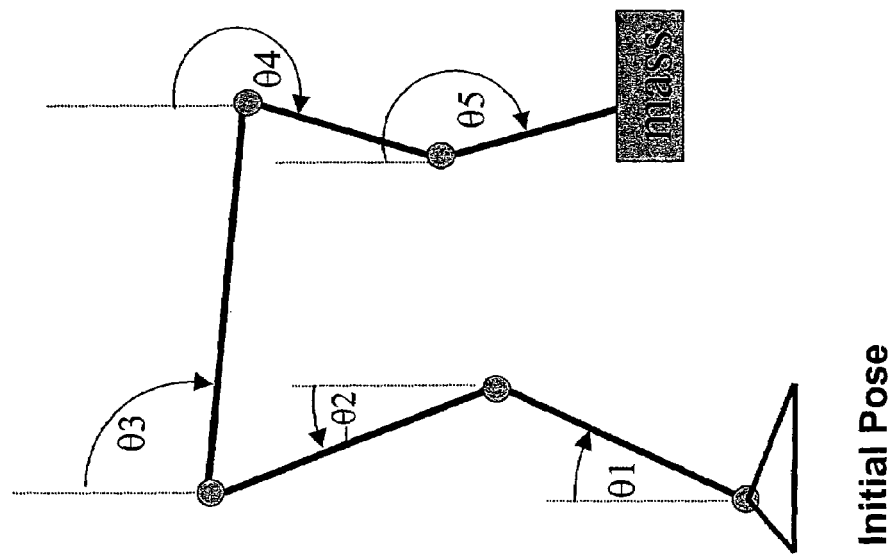

The gravity compensation protocols are simulated for a lifting/lowering motion of a mass representing a manual material handling task. A six-link planar system modeling the foot, lower leg, upper leg, torso, upper arm, and lower arm is used to conduct the analysis, as shown in FIG. 4. The effect of dynamic factors and external mass on the various kinetic and kinematic parameters of the lift have been studied extensively by biomechanists. References should be made to the following documents that which are incorporated by reference in their entirety. D. Gagnon and M. Gagnon, "The influence of dynamic factors on triaxial net muscular moments at the l5/s1 joint during asymmetrical lifting and lowering" *Journal of Biomechanics,* 25:891-901, 1992, and S. H. Hsiang and R. W. McGorry, "Three different lifting strategies for controlling the motion patterns of the external load" *Ergonomics,* 40:928-939, 1997.

Such studies have been performed to reduce the risk factor through identification of ergonomic intervention.

Figure 7:
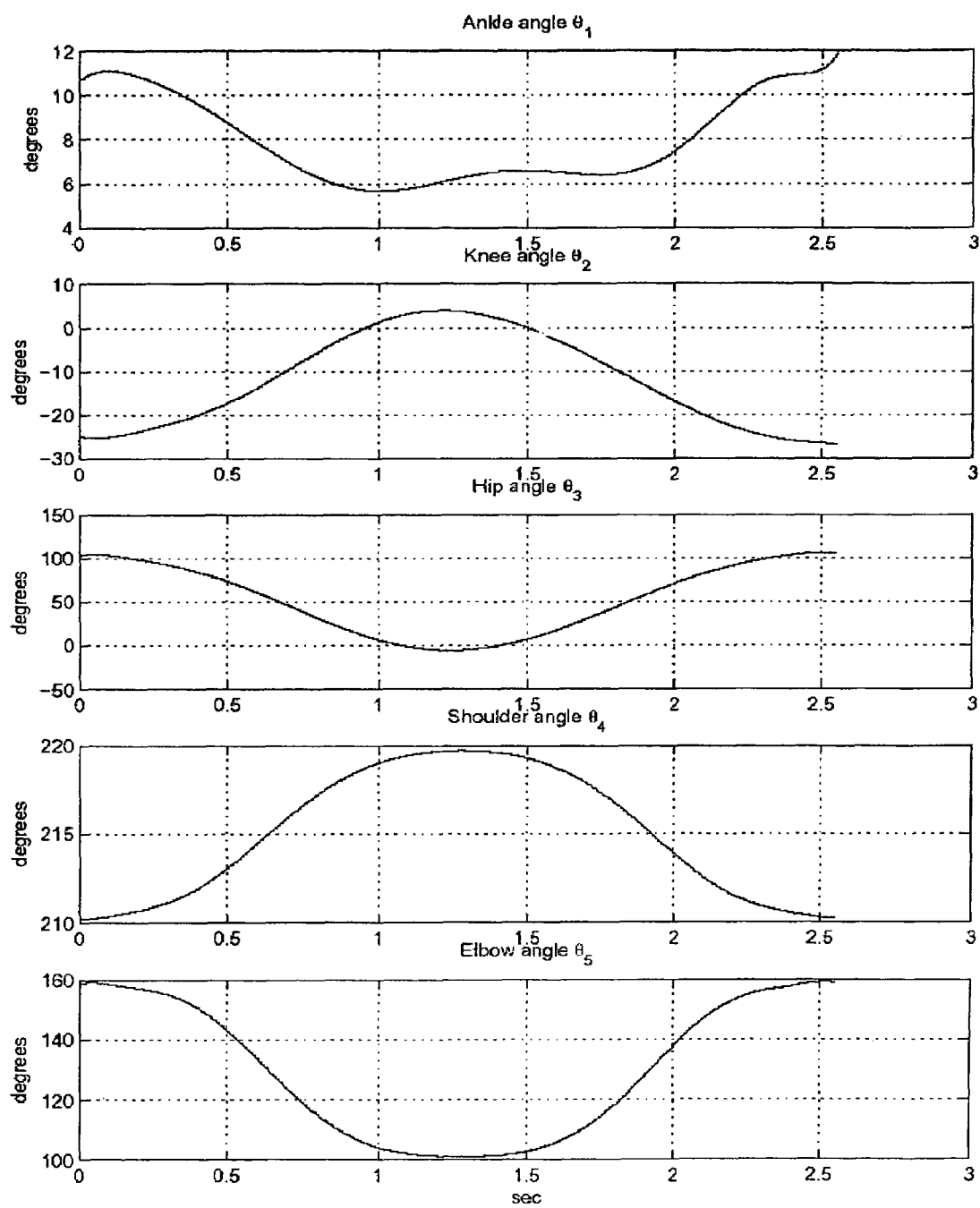
FIG. 7 shows a motion trajectories at the five joints for a lifting and lowering motion of a 10 kg mass.
Figure 8:
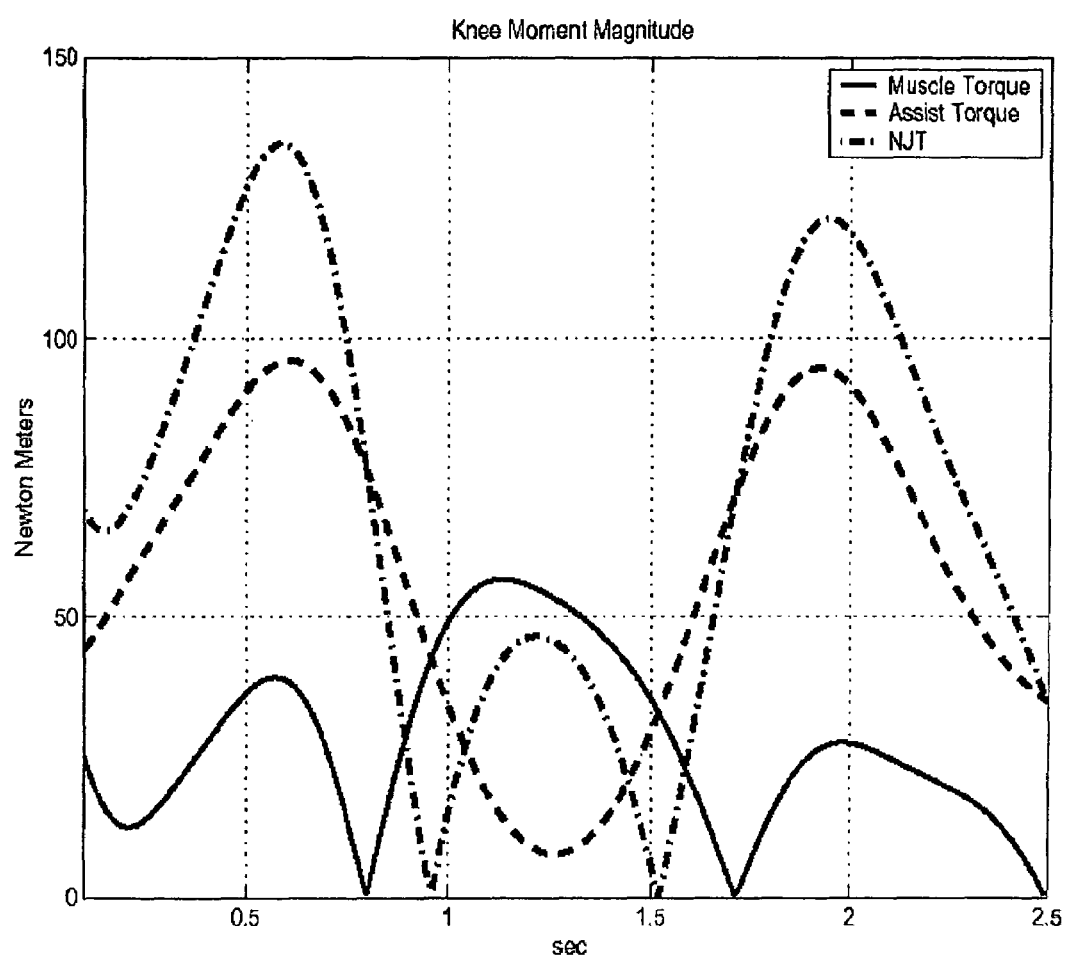
FIG. 8 shows simulated comparison of the magnitude of the assist torque, muscle torque, and net joint torque at the knee.

FIG. 7 shows a motion trajectories at the five joints for a lifting and lowering motion of a 10 kg mass. FIG. 8 shows simulated comparison of the magnitude of the assist torque, muscle torque, and net joint torque at the knee. In the region where the muscle torque at the knee exceeds the net joint torque at the knee, gravity compensation control increases the mechanical power required by the muscles to perform the task. Our analysis cannot predict whether metabolic power is increased or decreased at each time instant. More sophisticated tools are required to fully understand the effect of gravity compensation on the metabolic cost. Moreover, gravity compensation may in fact improve stability at the expense of increased mechanical work.

Figure 9:
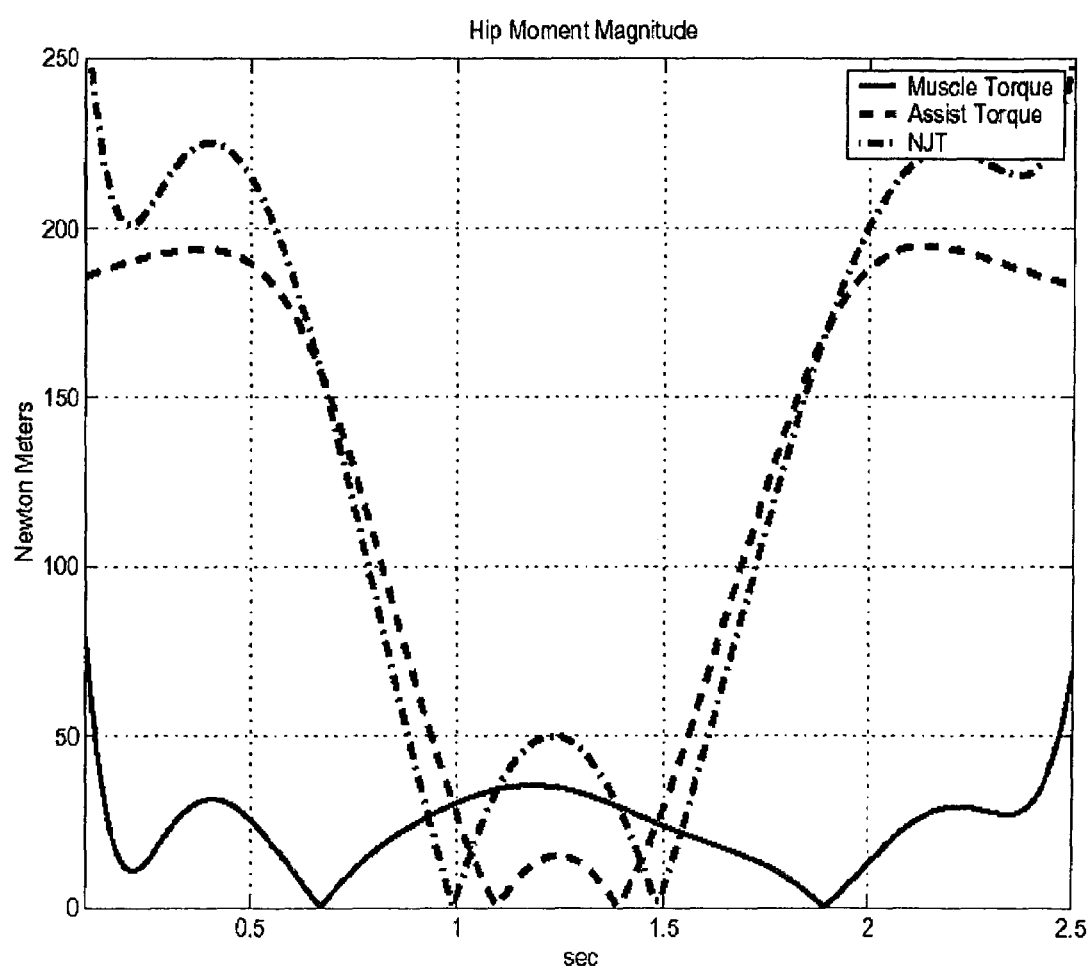
FIG. 9 shows simulated comparison of the magnitude of the assist torque, muscle torque, and net joint torque at the hip.
Figure 10:
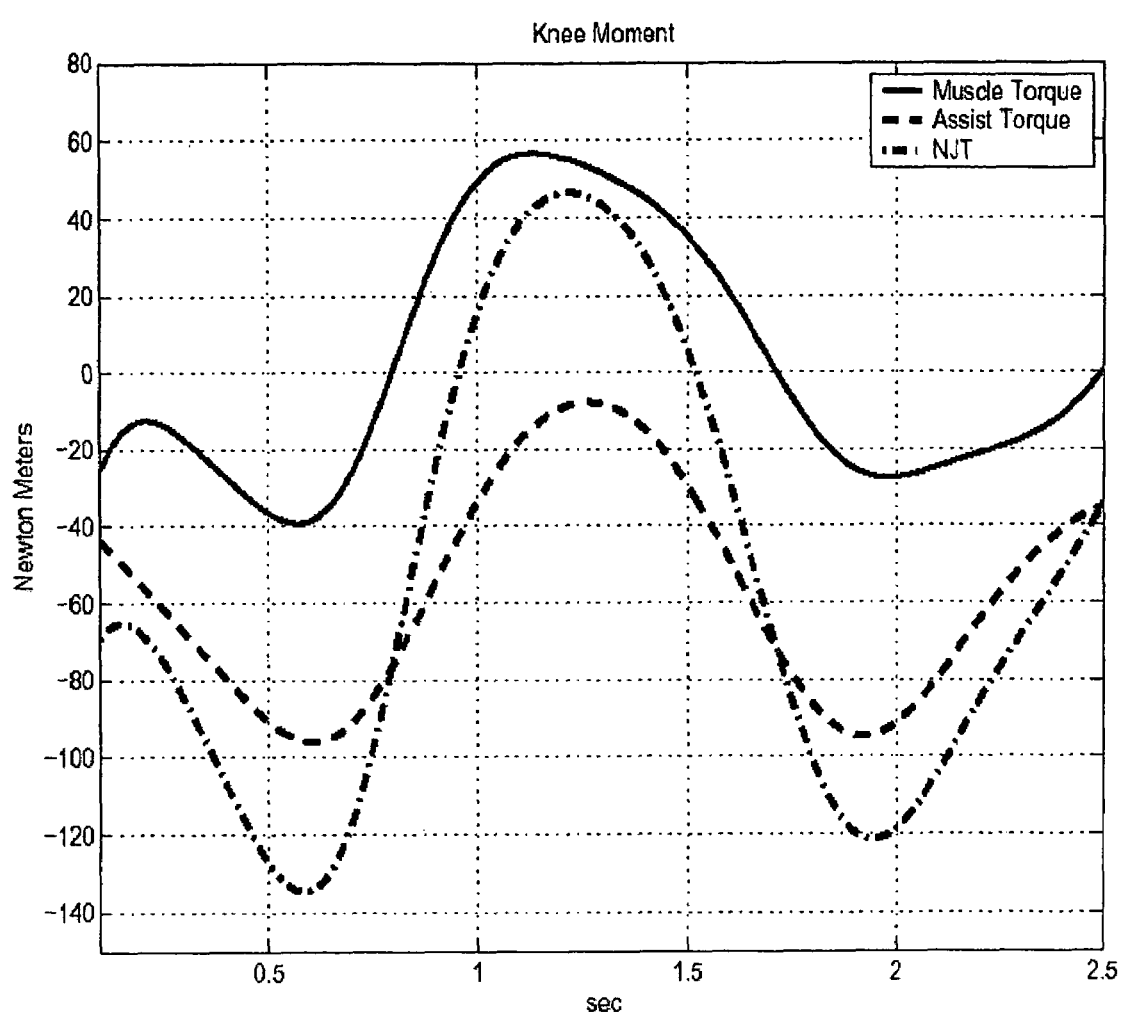
FIG. 10 shows simulated comparison of the assist torque, muscle torque, and net joint torque at the knee.
Figure 11:
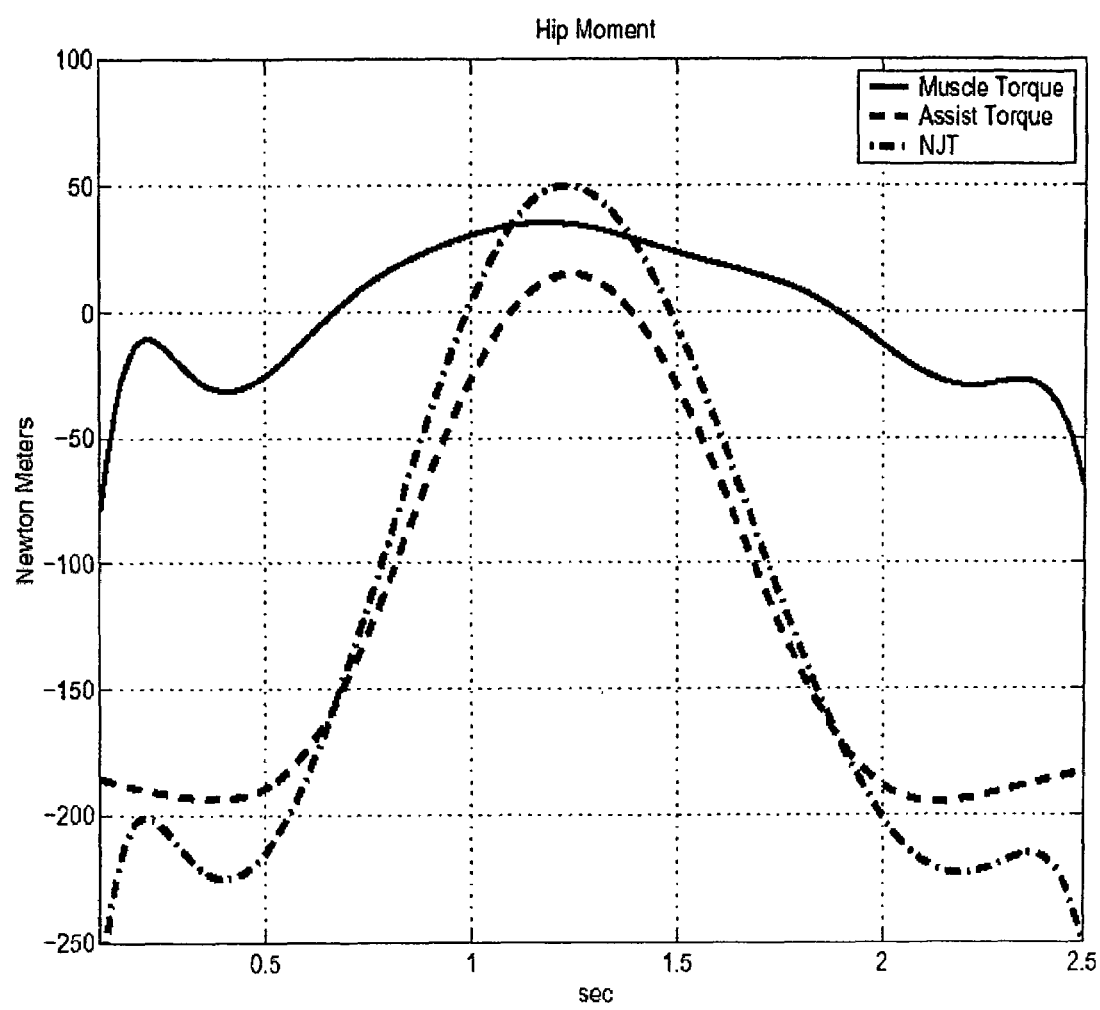
FIG. 11 shows simulated comparison of the assist torque, muscle torque, and net joint torque at the hip.
Figure 12:
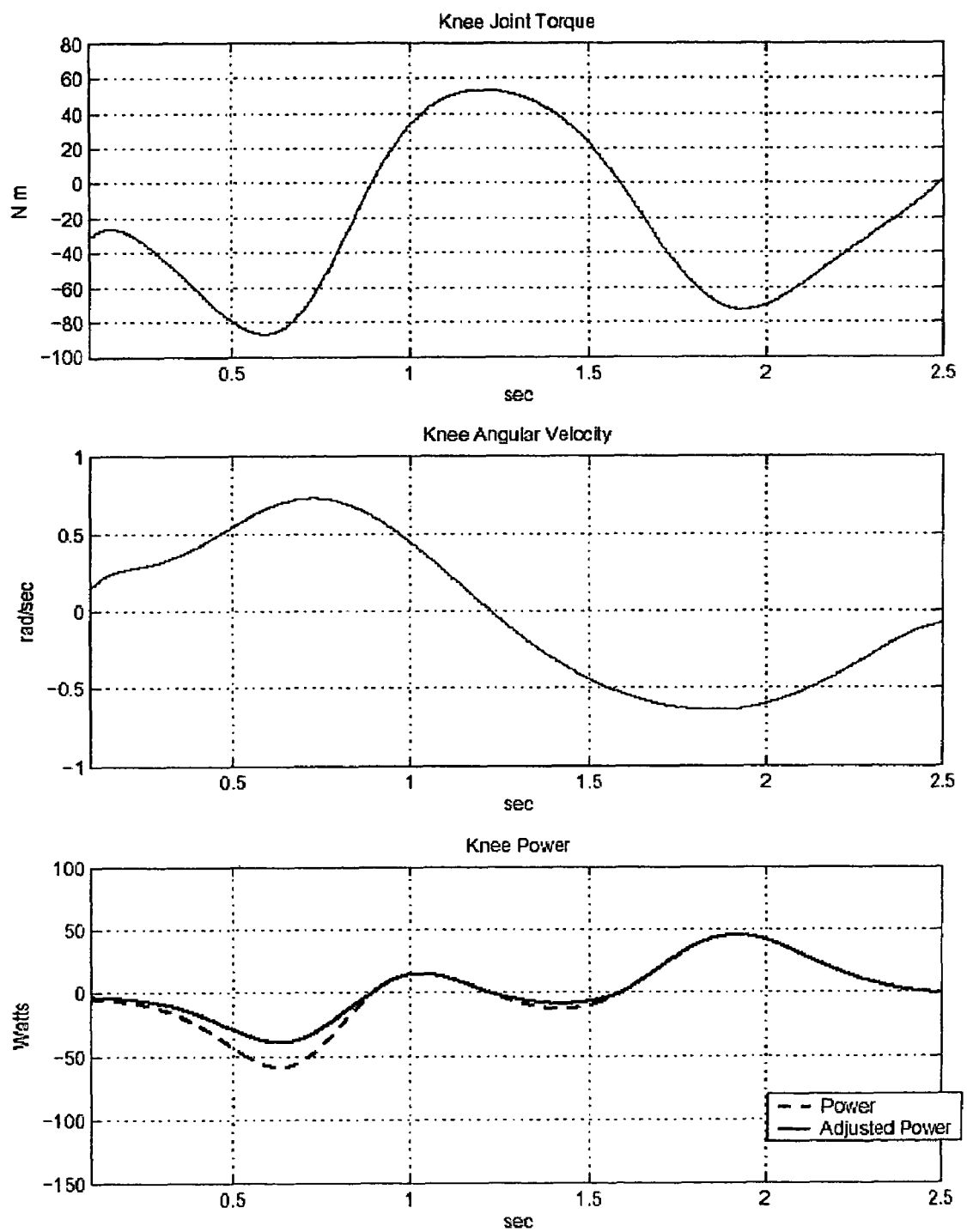
FIG. 12 shows quantities for estimating joint power at the knee, including the joint torque (top), and joint angular velocity (middle).
Figure 13:
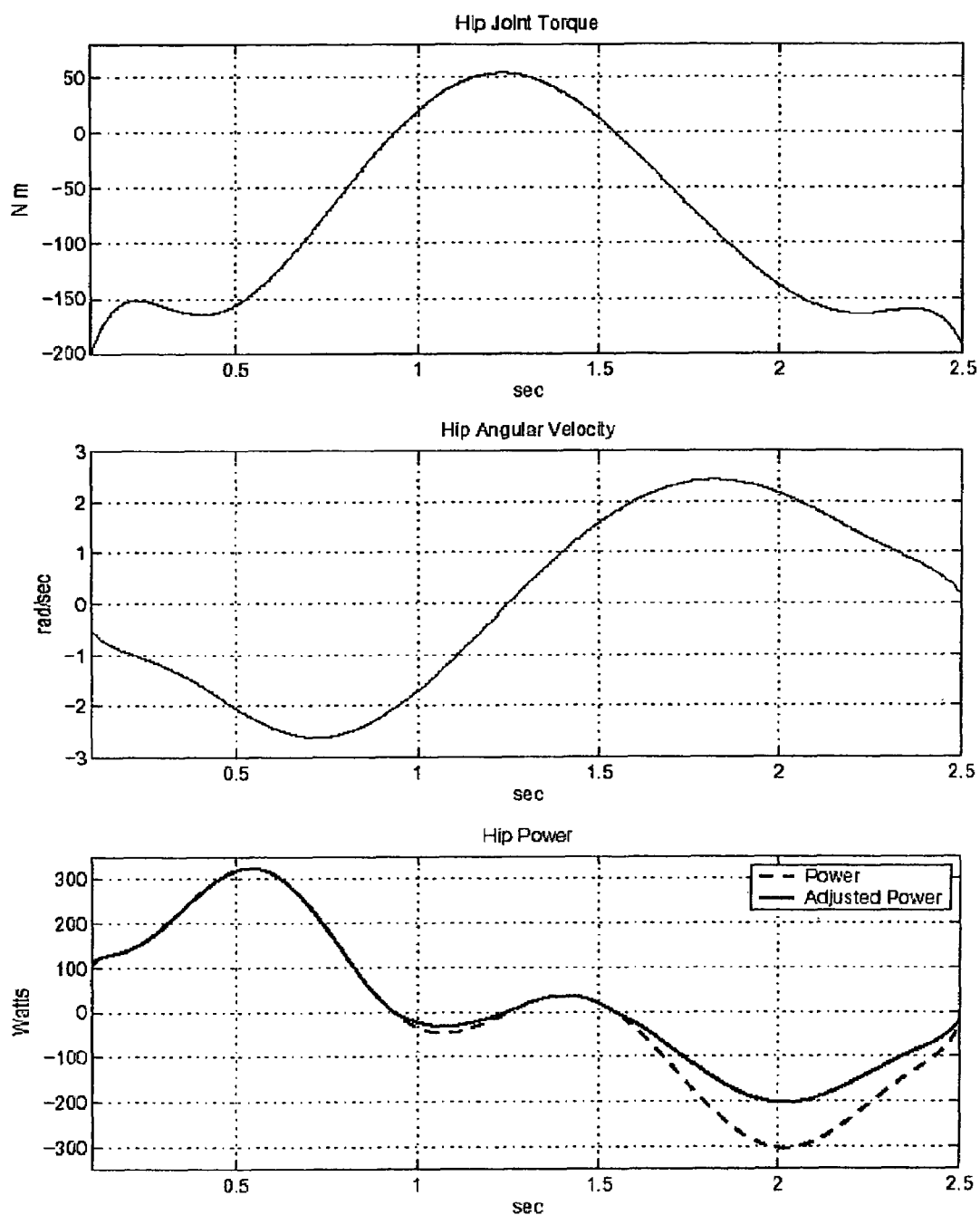
FIG. 13 shows quantities for estimating joint power at the hip, including the joint torque (top), and joint angular velocity (middle).
Figure 14:
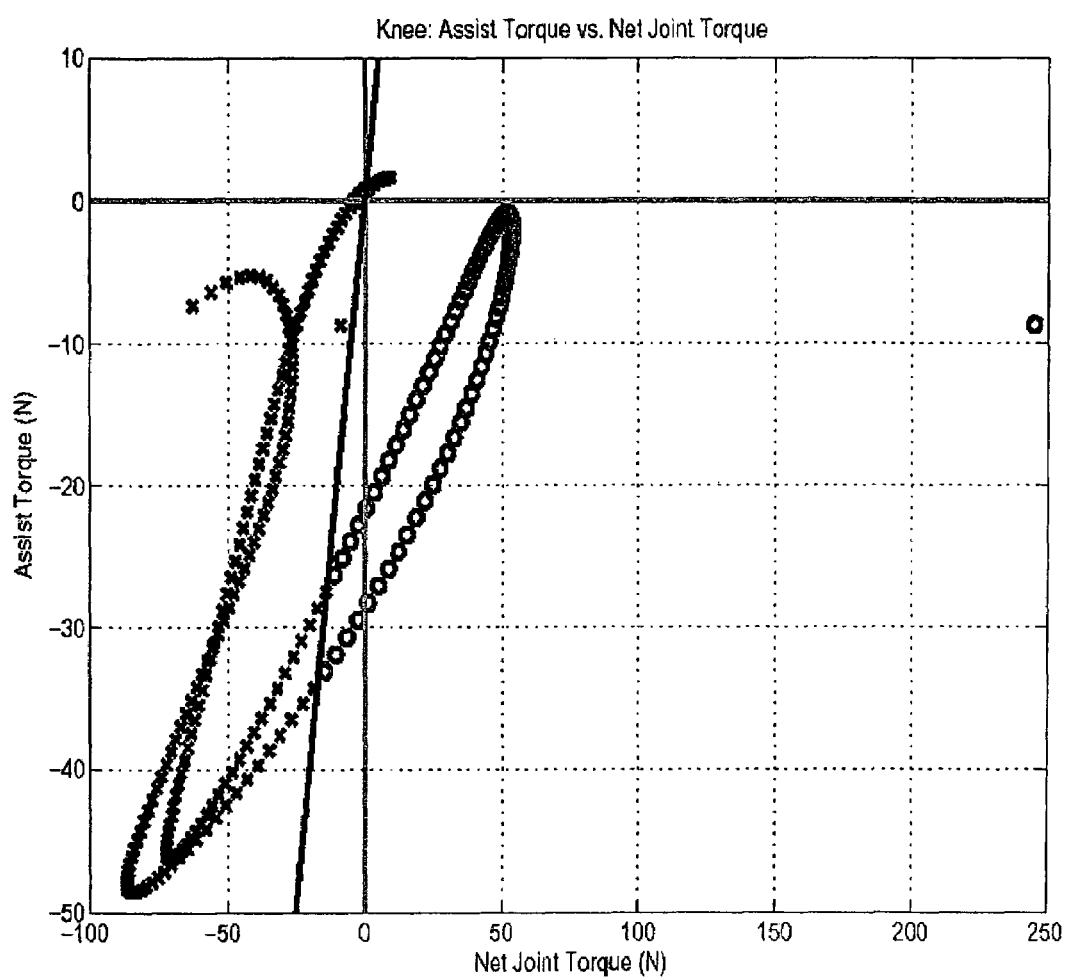
FIG. 14 shows feasibility region of assist torque vs. net joint torque at the knee joint.
Figure 15:
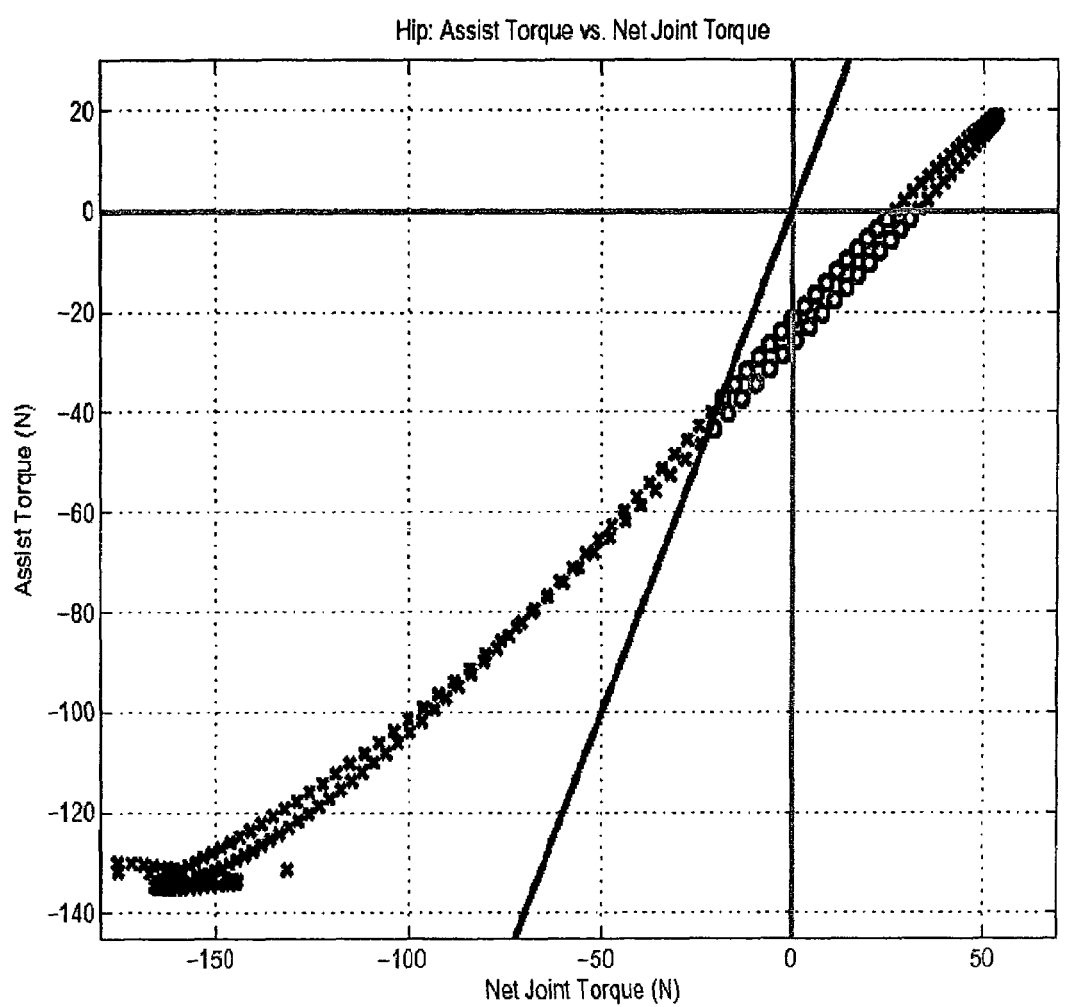
FIG. 15 shows feasibility region of assist torque vs. net joint torque at the hip joint.

FIG. 9 shows simulated comparison of the magnitude of the assist torque, muscle torque, and net joint torque at the hip. Gravity compensation control increases the mechanical power required by the muscle to perform the task in the region where the muscle torque at the hip exceeds the net joint torque at the hip. FIG. 10 shows simulated comparison of the assist torque, muscle torque, and net joint torque at the knee. Gravity compensation decreases the efficiency of motion in the region where the assist torque and net joint torque have opposite signs. FIG. 11 shows simulated comparison of the assist torque, muscle torque, and net joint torque at the hip. Gravity compensation decreases the efficiency of motion in the region where the assist torque and net joint torque have opposite signs. FIG. 12 shows quantities for estimating joint power at the knee, including the joint torque (top), and joint angular velocity (middle). The joint power is plotted in the bottom graph. The adjusted joint power considers the metabolic cost index of positive and negative work. Based on data available from the literature, an index of $n^-=1.5$ and $n^+=1.0$ was used in this simulation. FIG. 13 shows quantities for estimating joint power at the hip, including the joint torque (top), and joint angular velocity (middle). The joint power is plotted in the bottom graph. The adjusted joint power considers the metabolic cost index of positive and negative work. Based on data available from the literature, an index of $n^-=1.5$ and $n^+=1.0$ was used in this simulation. FIG. 14 shows feasibility region of assist torque vs. net joint torque at the knee joint. The feasibility region of gravity assist is denoted by the 'x' plot ticks. The region with the 'o' plot ticks produce voluntary muscle torque which are not feasible. FIG. 15 shows feasibility region of assist torque vs. net joint torque at the knee joint. The feasibility region of gravity assist is denoted by the blue 'x' plot ticks. The region with the 'o' plot ticks produce voluntary muscle torque which are not feasible.

FIGS. 8 to 11 show that muscle torques at knee and hip joints are considerably reduced in comparison with net joint torques. This means that the iterative "ground up" gravity compensation has significantly reduced the work required by the muscles to perform this task.

Figure 16:
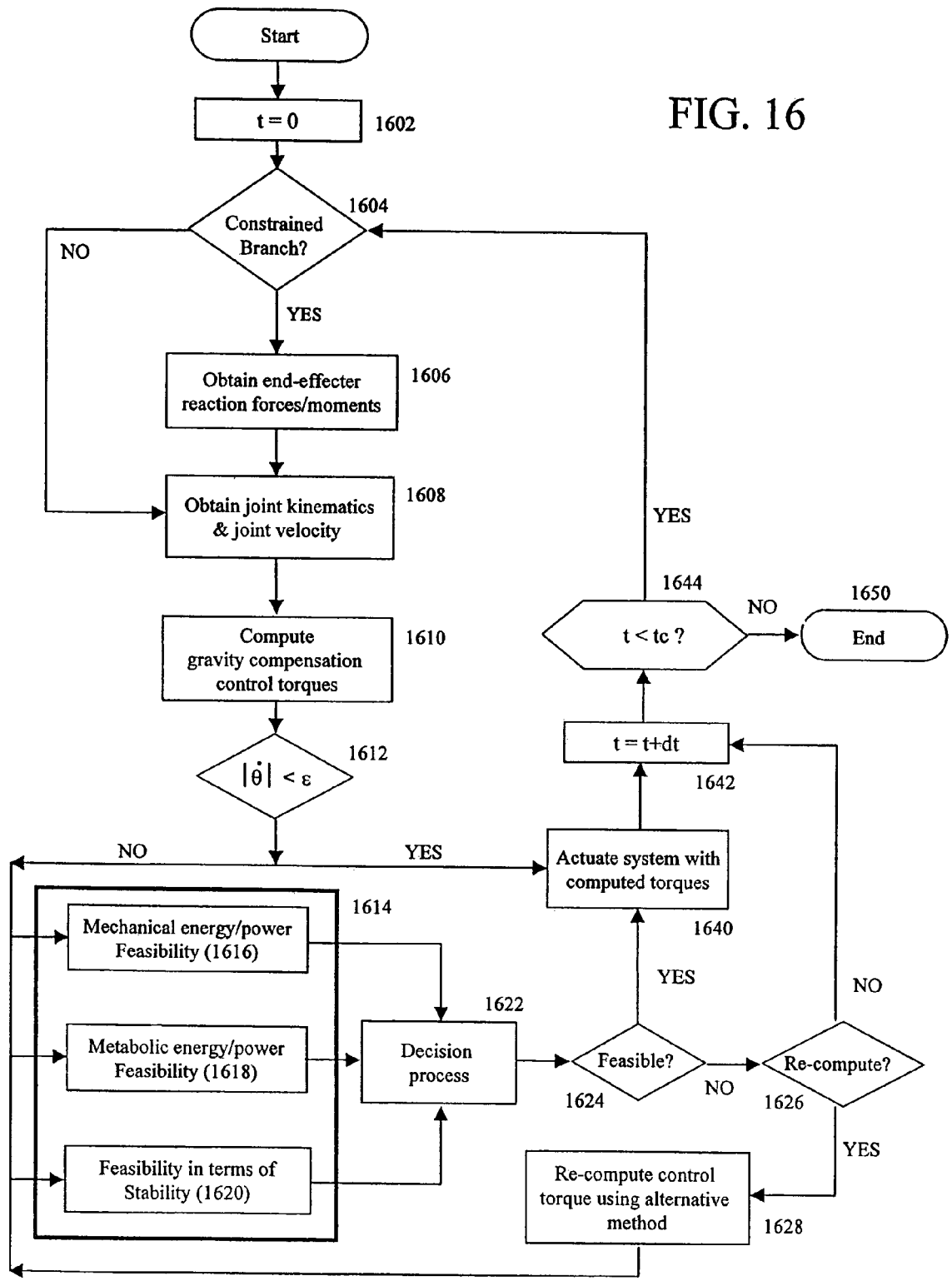
FIG. 16 is a flowchart illustrating a technique for determining and applying torques based upon multiple factors according to one embodiment of the present invention.

FIG. 16 is a flowchart illustrating a technique for determining and applying torques based upon multiple factors according to one embodiment of the present invention. An algorithm for controlling a particular joint motion and determining the proper force to be applied and whether or not any force should be applied to a particular joint is set forth in FIG. 16 and described herein. It will be apparent that the algorithm describes one embodiment of the present invention. In this embodiment, the process repeats for a period of time (t) by setting 1602 a time "t" equal to zero, incrementing 1642 by a delta (dt) and repeating until t exceeds 1644 a threshold, (tc). The process begins by determining 1604 whether the end-effector of the branch associated with the joint is in contact with the environment, i.e., is it constrained. If there is no contact, i.e., not constrained, then the forces and moments acting on the end-effector are known to be zero and the process continues with step 1608. If there is contact with the environment, i.e., the end-effector is constrained, then the reaction forces and moments are determined 1606. The reaction forces and moments can be estimated analytically or obtained using sensors. An example of a technique for analytically estimating the reaction forces and moments is set forth in R. Featherstone and D. Orin, "Robot Dynamics: Equation and Algorithms" International Conference on Robotics and Automation, San Francisco, Calif. 2000 which is incorporated by reference herein in its entirety.

The process continues by determining 1608 the kinematics and velocities describing the degrees of freedom of a particular joint of interest. These values can be estimated directly or derived from sensor measurements. The gravity compensation control torques are calculated 1610 using the procedures described above.

One embodiment of the present invention then determines whether there is any substantial movement between the segments surrounding the joint. If the absolute value of the relative jangular velocity between two connected body segments is less than a small threshold ($\epsilon$) 1612 then there is essentially no joint movement. If the relative motion spanning a joint is zero, then no mechanical work occurs. However, since the muscles are contracting isometrically to compensate for gravity, there is a metabolic cost for which the present invention accounts. The small threshold is used to account for measurement and model errors. If there is essentially no relative motion between adjacent segments, then the gravity compensation torques calculated in step 1610 are used 1640 as the control methodology and can be applied to drive the system. The process continues by incrementing 1642 the time or, in alternate embodiments, analyzing another joint.

If the absolute value of the relative angular velocity between two connected body segments exceeds the threshold, then the present invention uses 1614 multiple criteria to assess the feasibility 1622 of the control algorithm. Some examples of such criteria include mechanical energy/power feasibility, metabolic energy/power feasibility, stability/equilibrium feasibility. As described above, the mechanical energy/power of an assist torque is feasible 1616 if the magnitude of the assisted muscle torques does not exceed the magnitude of the unassisted muscle torque as represented in FIG. 1 which shows the regions of mechanically feasible assist torques in relation to the net joint torque.

Similarly, the present invention can use metabolic energy/power feasibility to determine 1618 the feasibility of the control algorithm. Determining the metabolic energy/power feasibility is more complicated than determining the mechanical energy/power feasibility. For example, each muscle may have a different efficiency index, most often approximated by a constant number. In reality, the efficiency index could be a nonlinear function of muscle parameters and system state variables. In addition, these indices may vary between people. In one embodiment, a control torque is determined to be feasible if the metabolic cost of assisted joint motion does not exceed the metabolic cost of the unassisted joint motion. One way of determining the metabolic cost is set forth in above in equation 12. From this equation the feasibility region may be constructed.

Another possible criteria is stability and maintaining equilibrium. The loss of stability causes the body to expend energy to regain balance (equilibrium reaction). Often times the equilibrium reaction comes at the expense of other motor skills including minimizing mechanical and metabolic energy. A preventative measure against the loss of stability is one that forces the mechanism responsible for maintaining equilibrium to employ the musculature to regain balance through body control. Evidence of stability taking precedence over energy consumption is in increased joint stabilization by co-contraction of antagonistic muscle pairs. Quantifying the stability can be done in a variety of ways such as the method of Lyapunov exponents as set forth by J. Dingwell et. al "Slower speeds in patients with diabetic neuropathy lead to improved local dynamic stability of continuous overground walking" Journal of Biomechanics, Vol 33, pp. 1269-1277 (2000). Lyapunov exponents quantify the rate at which orbits on an attractor converge or diverge as the system evolves in time, and provide a direct measure of the stability of those orbits. A positive value for the largest Lyapunov exponent is an indication of the global instability and sensitivity to initial conditions that define the presence of chaos. Another method to quantify dynamic stability is by computing the rate of change of angular momentum as described by A. Goswami and V. Kallem "Rate of change of angular momentum and balance maintenance of biped robots" Proceedings of the International Conference on Robotics and Automation (2004). The relative instability of the system is directly correlated to the magnitude of the rate of change in angular momentum. The importance of the stability/equilibrium feasibility 1620 depends upon the specific subject and task and the stability feasibility 1620 determination may account for a such variables. For example, stability control may be more important when the task is carrying a heavy load as compared to walking or when the subject is elderly as compared to a young subject.

The present invention combines 1622 the feasibility results from two or more of the various criteria. In this example, the invention combines 1622 the results from the mechanical energy/power feasibility determination 1616, the metabolic energy/power feasibility determination 1618 and the stability feasibility determination 1620 to determine the feasibility of the control torque determined in step 1610. The decision process 1622 can be as simple as a weighted average of the outcome of each of the three decisions, or it may be a more complex reasoning process, such as Fuzzy Logic based decision inferencing. The decision process 1622 may vary depending upon the application, the human-subject and the joint being analyzed. If the outcome of the decision process 1622 is feasible 1624 then the control methodology can be applied 1640 using the computed forces. Otherwise, the if re-computation is selected 1626 then the system re-computes 1628 the control forces (torques) using an alternative method and the re-computed forces are input to step 1614 and the process continues in the manner described above. An example of an alternative re-computation technique is to use predictive control methods, whereby the current state and controls are used to estimate future states. Once the next states are estimated, the controls may be computed based on feedback using error correction feedback. If re-computation is not selected 1626 the process continues by incrementing 1642 the time.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention as it is defined in the appended claims.

What is claimed is:

1. A method for obtaining an assist torque to be applied to a human joint, in a human assist system for applying an assist torque to the human joint, comprising the steps of:

determining a gravity compensation control torque value for a first joint;

identifying said gravity compensation control torque as being feasible if the relative angular velocity between first and second segment of said first joint is substantially zero; and identifying a gravity compensation control torque feasibility value when said relative angular velocity between said first and second segments of said first joint is not substantially zero, including the steps of:

determining a mechanical energy feasibility value of said gravity compensation control torque, determining a metabolic energy feasibility value of said gravity compensation control torque, the metabolic energy feasibility value based on metabolic efficiencies associated with concentric work and eccentric work, and calculating said gravity compensation control torque feasibility value based upon said mechanical energy feasibility value and said metabolic energy feasibility value.

2. The method of claim 1, wherein said mechanical energy feasibility value represents a relationship between a value of an assisted muscle torque and a value of an unassisted muscle torque.

3. The method of claim 1, wherein said metabolic energy feasibility value represents a relationship between a value of a metabolic cost of assisted control and a value of a metabolic cost of unassisted control.

4. The method of claim 1, further comprising the step of:
determining a stability feasibility factor for said gravity compensation control torque.

5. The method of claim 4, wherein said step of calculating said gravity compensation feasibility value is based upon said mechanical energy feasibility value, said metabolic energy feasibility value and said stability feasibility factor.

6. The method of claim 5, further comprising the step of applying said gravity compensation feasibility factor when said gravity compensation feasibility factor value exceeds a first threshold.

7. The method of claim 1, further comprising the step of applying said gravity compensation feasibility factor when said gravity compensation feasibility factor value exceeds a first threshold.

8. A method for obtaining an assist torque to be applied to a human joint, in a human assist system for applying an assist torque to the human joint, comprising the steps of:
determining a gravity compensation control torque value for a first joint;
identifying said gravity compensation control torque as being feasible if the relative angular velocity between first and second segments of the said first joint is substantially zero; and
identifying a gravity compensation control torque feasibility value when the relative angular velocity between said first and second segments of the said first joint is not substantially zero, including the steps of:
determining a mechanical energy feasibility value of said gravity compensation control torque, the mechanical energy feasibility value based on determining whether the assist torque is mechanically feasible,
determining a stability feasibility factor for said gravity compensation control torque, and
calculating said gravity compensation control torque feasibility value based upon said mechanical energy feasibility value and said stability feasibility factor.

9. The method of claim 8, wherein said mechanical energy feasibility value represents a relationship between a value of an assisted muscle torque and a value of an unassisted muscle torque.

10. A method for obtaining an assist torque to be applied to a human joint, in a human assist system for applying an assist torque to the human joint, comprising the steps of:
determining a gravity compensation control torque value for a first joint;
identifying said gravity compensation control torque as being feasible if the relative angular velocity between first and second segments of the said first joint is substantially zero; and
identifying a gravity compensation control torque feasibility value when said angular velocity between said first and second segments of the said first joint is not substantially zero, including the steps of:

determining a metabolic energy feasibility value of said gravity compensation control torque, the metabolic energy feasibility value based on metabolic efficiencies associated with concentric work and eccentric work,
determining a stability feasibility factor for said gravity compensation control torque, and
calculating said gravity compensation control torque feasibility value based upon said metabolic energy feasibility value and said stability feasibility factor.

11. A system for obtaining an assist torque to be applied to a human joint, in a human assist system for applying an assist torque to the human joint, comprising:
means for determining a gravity compensation control torque value for a first joint;
first identifying means for identifying said gravity compensation control torque as being feasible if the relative angular velocity between first and second segments of said first joint is substantially zero; and
second identifying means for identifying a gravity compensation control torque feasibility value when the said angular velocity between said first and second segments of the said first joint is not substantially zero, including:
mechanical feasibility means for determining a mechanical energy feasibility value of said gravity compensation control torque,
metabolic feasibility means for determining a metabolic energy feasibility value of said gravity compensation control torque, the metabolic energy feasibility value based on metabolic efficiencies associated with concentric work and eccentric work, and
first calculating means for calculating said gravity compensation control torque feasibility value based upon said mechanical energy feasibility value and said metabolic energy feasibility value.

12. The system of claim 11, wherein said mechanical energy feasibility value represents a relationship between a value of an assisted muscle torque and a value of an unassisted muscle torque.

13. The system of claim 11, wherein said metabolic energy feasibility value represents a relationship between a value of a metabolic cost of assisted control and a value of a metabolic cost of unassisted control.

14. The system of claim 11, further comprising:
stability feasibility means for determining a stability feasibility factor for said gravity compensation control torque.

15. The system of claim 14, wherein said first compensation means calculates said gravity compensation feasibility value based upon said mechanical energy feasibility value, said metabolic energy feasibility value and said stability feasibility factor.

16. The system of claim 15, further comprising application means for applying said gravity compensation feasibility factor when said gravity compensation feasibility factor value exceeds a first threshold.

17. The system of claim 11, further comprising application means for applying said gravity compensation feasibility factor when said gravity compensation feasibility factor value exceeds a first threshold.

18. A system for obtaining an assist torque to be applied to a human joint, in a human assist system for applying an assist torque to the human joint, comprising:
means for determining a gravity compensation control torque value for a first joint; first identifying means for identifying said gravity compensation control torque as being feasible if the angular velocity of between first and second segments of the said first joint is substantially zero; and second identifying means for identifying a gravity compensation control torque feasibility value when said angular velocity between first and second segments of said first joint is not substantially zero, including:

mechanical feasibility means for determining a mechanical energy feasibility value of said gravity compensation control torque, the mechanical energy feasibility value based on determining whether the assist torque is mechanically feasible, stability feasibility means for determining a stability feasibility factor for said gravity compensation control torque, and first calculating means for calculating said gravity compensation control torque feasibility value based upon said mechanical energy feasibility value and said stability feasibility factor.

19. The system of claim 18, wherein said mechanical energy feasibility value represents a relationship between a value of an assisted muscle torque and a value of an unassisted muscle torque.

20. A system for obtaining an assist torque to be applied to a human joint, in a human assist system for applying an assist torque to the human joint, comprising:

means for determining a gravity compensation control torque value for a first joint;

first identifying means for identifying said gravity compensation control torque as being feasible if the said relative angular velocity between the first and second segments connecting the said first joint is substantially zero; and second identifying means for identifying a gravity compensation control torque feasibility value when the said relative angular velocity between said first and second segments connecting the said first joint is not substantially zero, including:

metabolic feasibility means for determining a metabolic energy feasibility value of said gravity compensation control torque, the metabolic energy feasibility value based on metabolic efficiencies associated with concentric work and eccentric work, stability feasibility means for determining a stability feasibility factor for said gravity compensation control torque, and first calculating means for calculating said gravity compensation control torque feasibility value based upon said metabolic energy feasibility value and said stability feasibility factor.

* * * * *